United States Patent [19]

Miyagawa et al.

[11] Patent Number: 6,044,051
[45] Date of Patent: Mar. 28, 2000

[54] OPTICAL INFORMATION RECORDING/ REPRODUCING DEVICE AND METHOD FOR RECORDING, REPRODUCING AND ERASING INFORMATION ON AN OPTICAL INFORMATION RECORDING MEDIUM UTILIZING LIGHT BEAM RADIATION

[75] Inventors: Naoyasu Miyagawa, Kawanishi; Mamoru Shoji, Sakai; Takashi Ishida, Yawata; Shigeru Furumiya, Himeji; Yuji Hisakado, Osaka, all of Japan

[73] Assignee: Matsushita Electric Industrial Co., Ltd., Osaka, Japan

[21] Appl. No.: 08/827,748

[22] Filed: Apr. 9, 1997

[30] Foreign Application Priority Data

Apr. 11, 1996 [JP] Japan ..................... 8-089237

[51] Int. Cl.⁷ ...................................................... G11B 7/00
[52] U.S. Cl. ................... 369/47; 369/48; 369/54
[58] Field of Search ............ 369/44.26, 44.29, 369/44.34, 275.3, 275.4, 54, 47, 48, 124

[56] References Cited

U.S. PATENT DOCUMENTS

| 5,404,345 | 4/1995 | Taki . |
| 5,444,682 | 8/1995 | Yamada et al. ................. 369/44.26 |
| 5,448,551 | 9/1995 | Miyagawa et al. . |
| 5,452,284 | 9/1995 | Miyagawa et al. . |
| 5,508,995 | 4/1996 | Moriya et al. ................. 369/275.4 |
| 5,638,354 | 6/1997 | Nakayama et al. ............ 369/44.26 |

FOREIGN PATENT DOCUMENTS

| 0 574 886 A2 | 12/1993 | European Pat. Off. . |
| 0 752 701 A2 | 8/1997 | European Pat. Off. . |
| 63-57859 | 11/1988 | Japan . |
| 6-176404 | 6/1994 | Japan . |
| 6-338064 | 12/1994 | Japan . |
| 7-29185 | 1/1995 | Japan . |

*Primary Examiner*—Thang V. Tran
*Attorney, Agent, or Firm*—Snell & Wilmer

[57] ABSTRACT

There is provided an optical information recording/ reproducing device for recording, reproducing, or erasing information on an optical information recording medium including information tracks formed on a disk substrate including alternating groove tracks and land tracks each including: a header region for recording identification data representing location information in pre-pits; and a data region for recording user data, the pre-pits being grouped into blocks, the blocks wobbling alternately toward an inner periphery or an outer periphery of the disk substrate along a radius direction from a center line of each information track by a distance which is substantially ½ of the information track pitch. The pre-pits are provided along the radius direction at a pitch twice as large as the track pitch. The device includes: an optical system for radiating a light beam as a converged beam spot on an information track; an optical detector including two light receiving portions divided in parallel to the track direction for receiving the light beam reflected from the recording medium; a signal generator for generating a differential signal and an addition signal of output signals respectively output from the light receiving portions; a header region detection circuit for determining whether the converged beam spot is tracing the header region or the data region using the differential signal; and at least one reading circuit for reading the identification data from the differential signal and for reading information recorded in the data region from the addition signal.

13 Claims, 14 Drawing Sheets

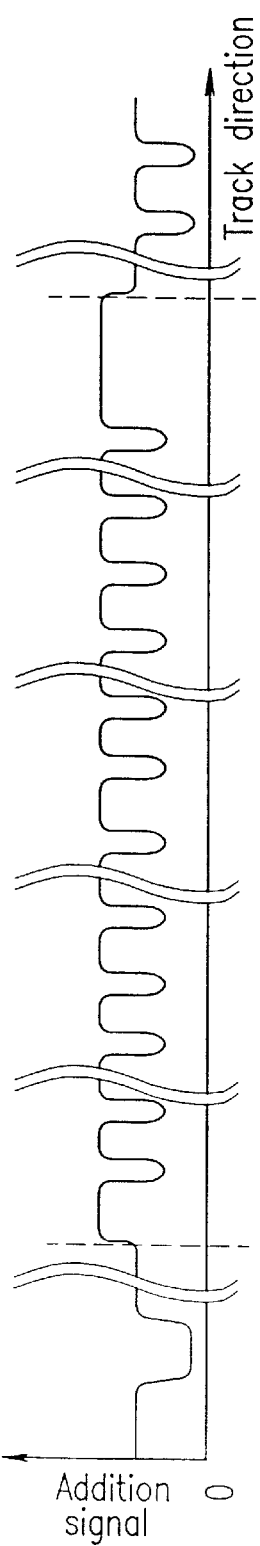
FIG. 6A  Addition signal
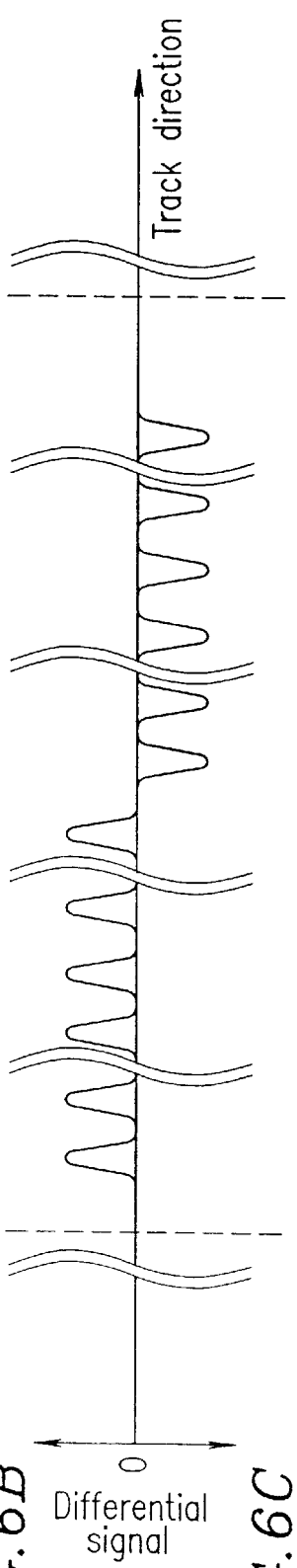
FIG. 6B  Differential signal
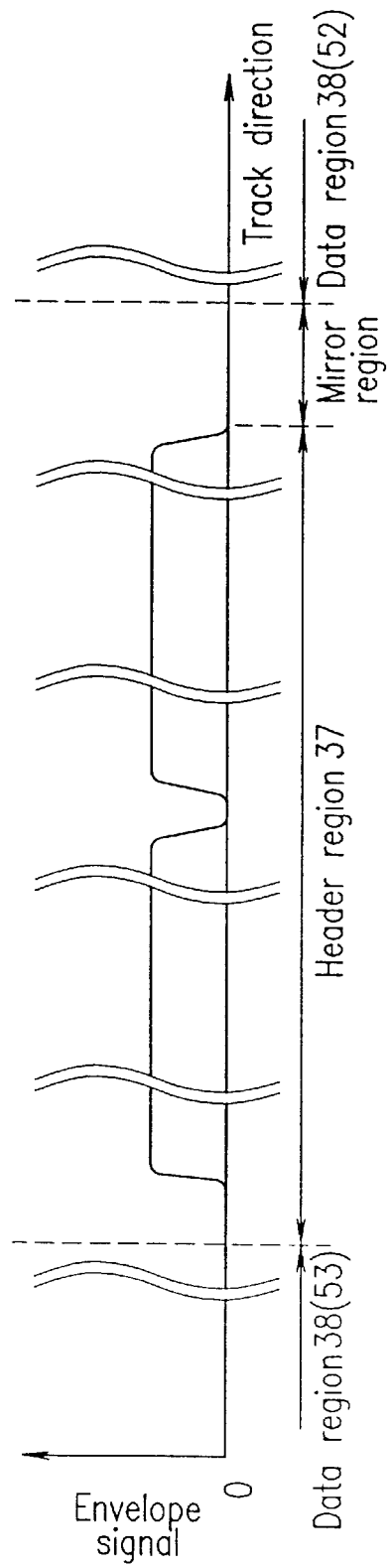
FIG. 6C  Envelope signal

PRIOR ART

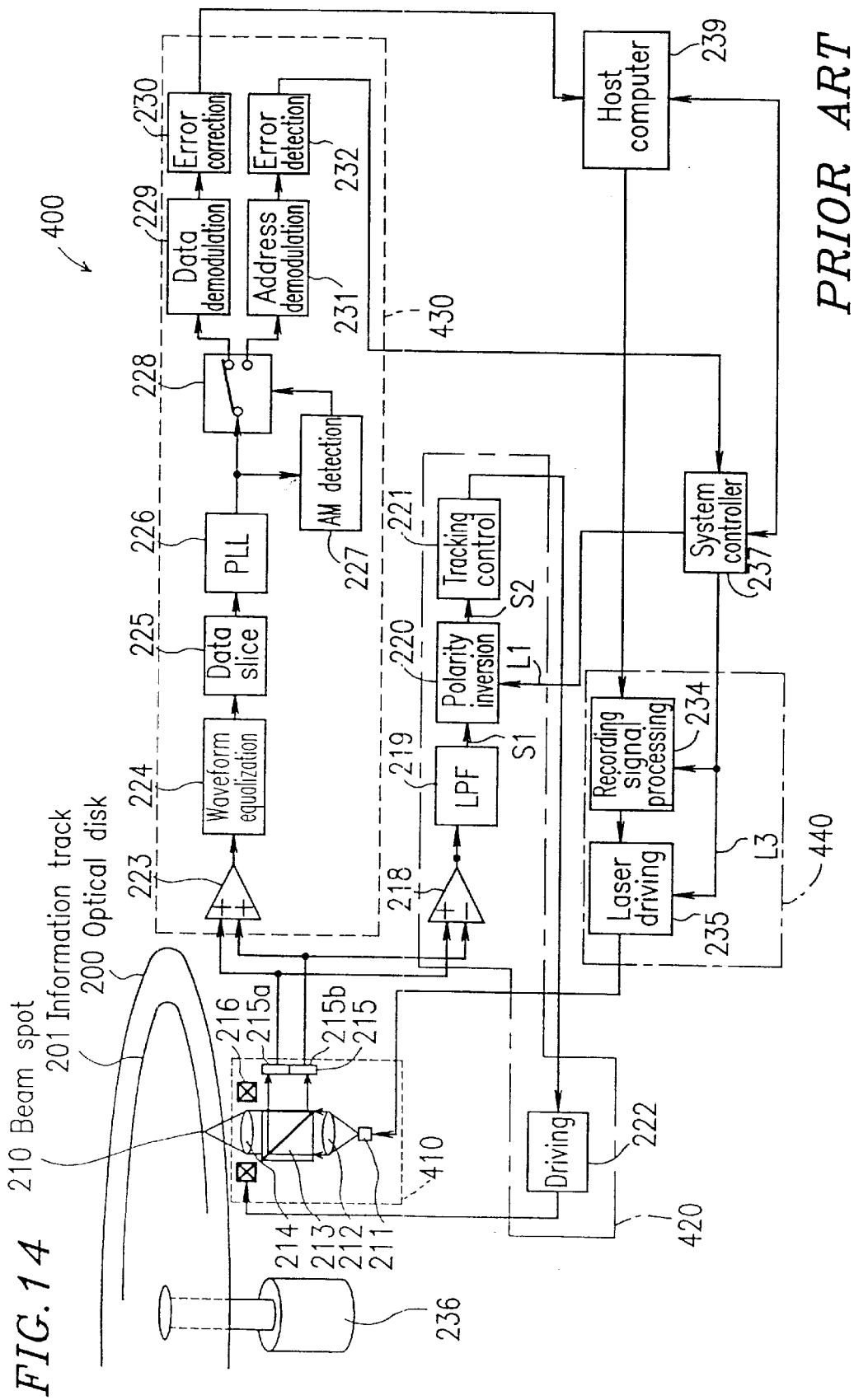

OPTICAL INFORMATION RECORDING/REPRODUCING DEVICE AND METHOD FOR RECORDING, REPRODUCING AND ERASING INFORMATION ON AN OPTICAL INFORMATION RECORDING MEDIUM UTILIZING LIGHT BEAM RADIATION

BACKGROUND OF THE INVENTION

1. Field of the Invention

The present invention relates to a device for recording, reproducing, or erasing information on a disk-shaped optical information recording medium (hereinafter referred to as an "optical information recording/reproducing device") and a method for the same. In particular, the present invention relates to a device and a method for recording, reproducing, or erasing information on an optical disk which utilizes both groove regions (defining "groove tracks") and land regions between grooves (defining "land tracks") as information tracks, the groove regions and the land regions having been previously formed on a disk substrate.

2. Description of the Related Art

In recent years, a great deal of research and development effort has been made in order to realize optical information recording media for recording and reproducing information data (e.g., video data and audio data) thereon. One example of such an optical information recording medium is an optical disk. A rewritable optical disk includes guide grooves (hereinafter referred to as "grooves") previously engraved on an optical disk substrate, the grooves being utilized as information tracks. Any region existing between adjoining grooves is referred to as a "land". Information can be recorded on or reproduced from the optical disk by converging a laser beam on the flat portions of grooves or lands. The information or data which users can record on an information recording medium at their own discretion will be referred to as "user data", as opposed to data that is previously recorded on the information recording medium.

In the case of commercially-available optical disks, information is typically recorded in either the groove region or the land region, the other region serving as a guard band for separating adjoining grooves or lands. When information signals are recorded in the grooves, for example, the lands serve as guard bands for separating adjoining information tracks defined by the grooves. Rewritable optical disks typically carries identification data which is previously recorded on the disk in the form of concave/convex pits (which are commonly referred to as "pre-pits"). Such pre-pits indicate location information (e.g., sector addresses) on the disk.

A technique for increasing the recording density of an optical disk is disclosed in Japanese Patent Publication No. 63-57859, where the track density is increased essentially by utilizing both grooves and lands as information tracks, i.e., by recording information on both grooves and lands (which are hence referred to as "groove tracks" and "land tracks", respectively). On the other hand, rewritable optical disks require the above-mentioned identification data, which represent location information and the like, to be previously recorded on the disk for enabling access by a user. Accordingly, the inventors of the present invention have proposed in Japanese Laid-Open Patent Publication No. 6-176404 (corresponding to U.S. Pat. No. 5,452,284) a technique of recording one identification data for an adjoining pair consisting of a groove and a land, the identification signal being recorded in a position between the groove and the land, whereby the manufacturing process of an optical disk is simplified. Hereinafter, such identification data, recorded in a position between an adjoining pair consisting of a groove track and a land track, will be referred to as an "intermediate address"; and the method of recording identification data in the form of an intermediate address shared by adjoining information tracks will be referred to as an "intermediate address method".

By referring to the figures, the concept of intermediate address will be described below, with respect to a tracking control method for reading information on an optical disk, and a method of reading an intermediate address signal.

FIGS. 12A and 12B schematically show the structure of a conventional optical disk 200 having sectors 202. As shown in FIG. 12A, the conventional optical disk 200 includes an information track(s) 201 formed in a spiral or concentric shape on a disk substrate. As shown in FIG. 12B, the information tracks 201 are divided into sectors 202, each sector 202 including a header region 203 (in which identification data is recorded) and a data region 204.

FIG. 13 shows the structure of information tracks of the conventional optical disk 200, where the above-described intermediate address method is adopted. As shown in FIG. 13, the information tracks 201 include groove tracks 208 and land tracks 209 alternately formed adjacent to each other. Within the data region 204, data is recorded in the form of recording marks 207 on both the groove track 208 and the land track 209. Within the header region 203, identification data is recorded in the form of pre-pits (address pits) 206. The data recorded on the information tracks 201 can be reproduced by the use of a beam spot 201.

As shown in FIG. 13, the groove track 208 and the land track 209 have the same width and the same track pitch of Tp. The address pits 206 are formed in such a manner that the center lines thereof are shifted from the center line of the corresponding groove track 208 by Tp/2 along the radius direction of the disk substrate (i.e., perpendicularly to the direction along which the information tracks 201 extends). The address pits 206 are provided on the boundaries between the groove track 208 and the land track 209 at a pitch of 2 Tp (i.e., so as to be provided on every other boundary between the groove track 208 and the land track 209).

FIG. 14 is a schematic block diagram illustrating an optical information recording/reproducing device 400 for recording or reproducing information on a conventional optical disk 200. It is assumed that the conventional optical disk 200 has an information track 201 (i.e., a groove track 208 or a land track 209) thereon as shown in the structure of FIG. 13. The optical information recording/reproducing device 400 (FIG. 14) includes an optical disk drive and a host computer 239. The optical disk drive includes an optical head 410, a tracking control/drive section 420, a reproduced signal processing section 430, a recording signal processing section 440, a spindle motor 236 for rotating the optical disk 200, and a system controller 237.

The optical head 410 includes a semiconductor laser 211, a collimation lens 212 for collimating laser light emitted from the semiconductor laser 211, a half mirror 213 located in the path of the collimated light, an objective lens 214 for converging the collimated light led through the half mirror 213 onto an information surface of the optical disk 200, and an actuator 216 supporting the objective lens 214. Thus, a beam spot is radiated on the information track 201 of the optical disk 200. The optical head 410 further includes an optical detector 215 for receiving light reflected from the optical disk 200 via the objective lens 214 and the half mirror 213. The optical detector 215 includes two light receiving portions 215a and 215b for generating a tracking error signal, the light receiving portions 215a and 215b defining two integral portions of the optical detector 215 divided in parallel to the direction along which the information track 201 extends. The semiconductor laser 211, the collimation lens 212, the half mirror 213, the object lens 214, the optical detector 215, and the actuator 216 are mounted on a head base (not shown), thus composing the optical head 410.

The tracking control/drive section 420 includes: a differential amplifier 218 for receiving the detected signals from the light receiving portions 215a and 215b of the optical detector 215 and outputting a signal representing a difference therebetween; a low-pass filter (LPF) 219 for receiving the differential signal; a polarity inversion circuit 220; a tracking control circuit 221; and a driving circuit 222. The LPF 219 subjects the differential signal from the differential amplifier 218 to a predetermined filtering process, and outputs a signal S1 to the polarity inversion circuit 220. The polarity inversion circuit 220 receives the signal S1 from the LPF 219 and a control signal L1 from the system controller 237 (described later), and outputs a signal S2 to the tracking control circuit 221. The tracking control circuit 221 receives the signal S2 from the polarity inversion circuit 220 and outputs a tracking control signal to the driving circuit 222. The driving circuit 222 receives the tracking control signal from the tracking control circuit 221 and outputs a driving current to the actuator 216.

The reproduced signal processing section 430 includes: an additive amplifier 223 for outputting a signal (addition signal) representing a sum of the detected signals from the light receiving portions 215a and 215b of the optical detector 215; a waveform equalization circuit 224 for receiving the addition signal and converting the frequency characteristics thereof; a data slice circuit 225 for receiving the output of the waveform equalization circuit 224 and outputting a digitized signal; a PLL (phase locked loop) 226 for generating a reproduction clock signal which is in synchronization with the digitized signal and outputting a digital reproduced signal in synchronization with the reproduction clock signal; an AM (address mark) detection circuit 227 and a selector 228 for receiving the digital reproduced signal; a data demodulation circuit 229; an error correction circuit 230; an address demodulation circuit 231; and an error detection circuit 232.

The AM detection circuit 227 receives a digital reproduced signal from the PLL 226 and outputs a control signal L2 to the selector 228. The selector 228 receives the digital reproduced signal from the PLL 226 and the control signal L2 from the AM detection circuit 227, and outputs the digital reproduced signal to a selected one of the data demodulation circuit 229 and the address demodulation circuit 231. The data demodulation circuit 229 receives the digital reproduced signal via the selector 228 and outputs demodulated data to the error correction circuit 230. The error correction circuit 230 receives the demodulated data from the data demodulation circuit 229 and outputs decoded data to the host computer 239. The address demodulation circuit 231 receives the digital reproduced signal via the selector 228 and outputs a demodulated address to the error detection circuit 232. The error detection circuit 232 receives the demodulated address from the address demodulation circuit 231 and outputs address data to the system controller 237.

The recording signal processing section 440 includes a recording signal processing circuit 234 and a laser driving circuit 235. The recording signal processing circuit 234 receives information signals representing e.g., digital video/audio data from the host computer 239 and computer data from the host computer 239 and a control signal L3 from the system controller 237, and outputs data to be recorded to the laser driving circuit 235. The laser driving circuit 235 receives the control signal L3 (from the system controller 237) and the data to be recorded (from the recording signal processing circuit 234) and outputs a driving current to the semiconductor laser 211.

The system controller 237 receives the address data from the error detection circuit 232 and controls the inputting/outputting of control data to/from the host computer 239. The system controller 237 also outputs the control signals L1 and L3 for controlling the polarity inversion circuit 220, the recording signal processing circuit 234, and the laser driving circuit 235.

The host computer 239, located external to the optical disk drive, controls the inputting/outputting information signals representing e.g., digital video/audio data from the host computer 239 as well as control data.

Hereinafter, the operations of the conventional optical information recording/reproducing device 400 having the above structure will be described.

First, the operation of reading information on the optical disk 200 will be described.

The laser driving circuit 235 is placed in a reproduction mode by the control signal L3 from the system controller 237, and supplies a driving current to the semiconductor laser 211 so that the semiconductor laser 211 is driven to emit light at a predetermined intensity for reading data.

Next, the position of the beam spot 210 along the focusing direction is controlled. It is assumed herein that a common focusing control method such as the astigmatic method is employed, and the description thereof is omitted.

A laser beam emitted from the semiconductor laser 211 is collimated by the collimation lens 212, led through the beam splitter (half mirror) 213, and converged onto the optical disk 200 by the objective lens 214. A light beam reflected from the surface of the optical disk 200, which is diffracted (and hence resulting in a certain distribution of reflected light) in accordance with the information carried on the information track 201, is led through the objective lens 214 to be incident on the optical detector 215 via the beam splitter 213.

The light receiving portions 215a and 215b of the optical detector 215 convert the variation in the intensity distribution of the incident light beam into electric signals (i.e., electric currents), and output the electric signals to the differential amplifier 218 and the additive amplifier 223. The differential amplifier 218 converts the input currents from the light receiving portions 215a and 215b into voltage signals, and then derives a difference therebetween which is output as a differential signal to the LPF 219.

The LPF 219 extracts the low frequency component from the differential signal, and outputs the low frequency component as the signal S1 to the polarity inversion circuit 220. In accordance with a control signal L1 input from the system controller 237, the polarity inversion circuit 220 may allow the signal S1 to pass or invert the polarities (i.e., plus or minus) thereof. As a result, the signal S2 is output to the tracking control circuit 221. The signal S2 is a so-called "radial push-pull signal" which corresponds to the tracking error amount between an actual position of the beam spot 210 converged on the information surface of the optical disk 200 and the target information track 201 that the beam spot 210 should trace.

It is assumed herein that the signal S1 is allowed to pass (without being inverted) in the case where the target information track is a groove track and that the signal S1 is inverted in the case where the target track is a land track. A "target" information track is defined as an information track which carries information to be reproduced or to which information is to be recorded.

The tracking control circuit 221 outputs a tracking control signal to the driving circuit 222 based on a level of the input signal S2. The driving circuit 222 supplies a driving current to the actuator 216 in accordance with the tracking control signal, whereby the position of the objective lens 214 along the direction across the information track 201 is controlled. As a result, the beam spot 210 properly scans on the information track 201.

Once the beam spot 210 is accurately positioned on the information track 201 of the optical disk 200, the currents output from the light receiving portions 215a and 215b, which correspond to the amount of reflected light from the recording marks 207 or the address pits 206, are added by the additive amplifier 223 to be output as an addition signal to the waveform equalization circuit 224. It should be noted that the amount of reflected light decreases when the light spot 210 is on the recording marks 207 and the address pits 206 due to optical interference, causing the outputs of the light receiving portions 215a and 215b to decrease accordingly, whereas the amount of reflected light increases when the light spot 210 is not on the recording marks 207 or the address pits 206, causing the outputs of the light receiving portions 215a and 215b to increase accordingly.

The waveform equalization circuit 224 modulates the addition signal so as to emphasize its high frequency component, thereby reducing inter-symbol interference. The data slice circuit 225 converts the modulated addition signal into a signal sequence of "0" and "1" (i.e., a digitized signal) by digitizing the modulated addition signal at a predetermined slice level. The PLL 226 extracts the data and the reproduction clock from the digitized signal, the data being output as a digital reproduced signal to the input terminals of the AM detection circuit 227 and the selector 228.

If the AM detection circuit 227 detects an AM signal identifying a header region within the digitized signal output from the PLL 226, the AM detection circuit 227 switches the selector 228 so that the digital reproduced signal is input to the address demodulation circuit 231. The address demodulation circuit 231 demodulates the digital reproduced signal so that the digital reproduced signal is converted into a demodulated address which can be suitably processed outside the optical information recording/reproducing device. The error detection circuit 232 determines whether or not the demodulated address that has been read includes an error, and in the absence of such an error outputs the demodulated address as address data to the system controller 237.

As the beam spot 210 reaches a data region in a certain time after the AM detection circuit 227 detected an AM signal, the AM detection circuit 227 switches the selector 228 so that the digital reproduced signal is input to the data demodulation circuit 229. The data demodulation circuit 229 demodulates the digital reproduced signal so that the digital reproduced signal is converted into demodulated data which can be suitably processed outside the optical information recording/reproducing device, which is output to the error correction circuit 230. The error correction circuit 230 corrects any error included in the demodulated data and outputs the demodulated data as the decoded data to the host computer 239.

In the operation of recording information on the optical disk 200, on the other hand, the system controller 237 outputs the control signal L3, thereby indicating a recording mods to the recording signal processing circuit 234 and the laser driving circuit 235. The host computer 239 outputs the information to be recorded (e.g., digitalized video/audio data and computer data) as recording data to the recording signal processing circuit 234. The recording signal processing circuit 234 adds an error correction code to the received recording data, and modulates the recording data for reproduction synchronization, whereby the modulated recording data is output to the laser driving circuit 235.

While the optical information recording/reproducing device is placed in the recording mode by the control signal L3, the laser driving circuit 235 modulates the driving current that is applied to the semiconductor laser 211 in accordance with the received recording date. As a result, the intensity of the beam spot 210 radiated on the optical disk 200 varies in accordance with the recording data, so that recording marks are formed on the optical disk 200 which are in accordance with the recording data.

During the above-described operations, the spindle motor 236 rotates the optical disk 200 at a constant angular or linear velocity.

However, in the above-described conventional optical information recording/reproducing device 400, the identification data in the header region 203, i.e., the output signal (AM signal) obtained from the address pits (pre-pits) formed on the boundaries between a land track and a groove track, is detected based on an addition signal representing a sum of the outputs of the optical detector 215. This implies that the detection accuracy of the identification signal may deteriorate once the beam spot 210 is off-center of the target track. For example, if the beam spot 210 is off-center of the target track, and away from the address pits 206, a corresponding decrease may result in the reproduced amplitude of the addition signal obtained from the header region 203.

Moreover, the beam spot 210 is susceptible to some optical modulation by the pre-pits 206 and the recording marks 207 while the beam spot 210 is in the header region 203 and the data region 204, respectively. As a result, the addition signal output from the additive amplifier 223 receives a degree of modulation, and a correspondingly modulated digital reproduced signal is input to the AM detection circuit 227. This implies that the AM detection circuit 227 may incorrectly determine that the digital reproduced signal derived from the data region 204 includes an AM signal.

SUMMARY OF THE INVENTION

According to one aspect of the present invention, there is provided an optical information recording/reproducing device for recording, reproducing, or erasing information on an optical information recording medium by radiating a light beam on the optical information recording medium, the optical information recording medium including information tracks formed in a spiral or concentric shape on a disk substrate, the information tracks including groove tracks and land tracks alternating with each other, each information track including: a header region for recording identification data in the form of pre-pits, the identification data representing location information on the disk substrate; and a data region for recording user data, the pre-pits being grouped into blocks each including a predetermined number of pre-pits, the blocks being disposed so as to be wobbled by a distance alternately toward an inner periphery or an outer periphery of the disk substrate along a radius direction of the disk substrate from a center line of each information track, the distance being substantially ½ of a track pitch of the information tracks. The optical information recording/reproducing device includes: an optical system for radiating a light beam as a converged beam spot on one of the information tracks of the optical information recording medium; an optical detector including two light receiving portions divided in parallel to the direction along which the one of the information tracks extends, the optical detector receiving the light beam reflected from the optical information recording medium; a signal generator for generating a differential signal and an addition signal of two output signals respectively output from the two light receiving portions of the optical detector; a header region detection circuit for determining whether the converged beam spot is tracing the header region or the data region based on the differential signal; and at least one reading circuit for reading the identification data from the differential signal and for reading information recorded in the data region from the addition signal.

In one embodiment of the invention, the header region detection circuit includes an envelope detection circuit for detecting an envelope of the differential signal and determines that the header region is being traced when the envelope exceeds a predetermined level.

In another embodiment of the invention, the optical information recording/reproducing device further includes a selector for selectively coupling either the differential signal or the addition signal to the reading circuit in accordance with a result of determination by the header region detection circuit, wherein the selector couples the differential signal to the reading circuit when the header region detection circuit determines that the header region is being traced; and the selector couples the addition signal to the reading circuit when the header region detection circuit determines that the data region is being traced.

In still another embodiment of the invention, the header region includes synchronization data for reproduction signal synchronization, and the header region detection circuit includes a synchronization signal detection circuit for detecting a synchronization signal from the differential signal, the synchronization signal corresponding to the synchronization data, and determines that the header region is being traced when the synchronization signal is detected.

In still another embodiment of the invention, the optical information recording/reproducing device further includes: a waveform equalization circuit for converting frequency characteristics of an input signal; and a digitization circuit for digitizing a signal output from the waveform equalization circuit in accordance with a predetermined threshold value, wherein the waveform equalization circuit converts the frequency characteristics of the addition signal by using a first property and converts the frequency characteristics of the differential signal by using a second property.

In still another embodiment of the invention, the waveform equalization circuit includes means for selecting the first or second property in accordance with a result of determination by the header region detection circuit.

In still another embodiment of the invention, the optical information recording/reproducing device further includes: a demodulation circuit for generating a demodulated signal by demodulating the digitized signal; an output circuit for selectively outputting the demodulated signal from the demodulation circuit, either as a demodulated address when the header region is being traced or as demodulated data when the data region is being traced; an error detection circuit for receiving the demodulated address and performing an error detection process for the demodulated address; and an error correction circuit for receiving the demodulated data and performing an error correction process for the demodulated data.

In still another embodiment of the invention, the waveform equalization circuit functions so that the differential signal whose frequency characteristics are converted by the second property is emphasized in its high frequency component relative to the addition signal whose frequency characteristics are converted by the first property.

According to another aspect of the invention, there is provided an optical information recording/reproducing method for recording, reproducing, or erasing information on an optical information recording medium by radiating a light beam on the optical information recording medium, the optical information recording medium including information tracks formed in a spiral or concentric shape on a disk substrate, the information tracks including groove tracks and land tracks alternating with each other, each information track including: a header region for recording identification data in the form of pre-pits, the identification data representing location information on the disk substrate; and a data region for recording user data, the pre-pits being grouped into blocks each including a predetermined number of pre-pits, the blocks being disposed so as to be wobbled by a distance alternately toward an inner periphery or an outer periphery of the disk substrate along a radius direction of the disk substrate from a center line of each information track, the distance being substantially ½ of a track pitch of the information tracks. The method includes the steps of: radiating a light beam as a converged beam spot on one of the information tracks of the optical information recording medium; detecting the light beam reflected from the optical information recording medium by using an optical detector including two light receiving portions divided in parallel to the direction along which the one of the information tracks extends; generating a differential signal and an addition signal of two output signals respectively output from the two light receiving portions of the optical detector; determining whether the converged beam spot is tracing the header region or the data region based on the differential signal; reading the identification data from the differential signal when the differential signal is selected; and reading information in the data region from the addition signal when the addition signal is selected.

In one embodiment of the invention, the step of determination includes the steps of: detecting an envelope of the differential signal; and determining that the header region is being traced when the envelope exceeds a predetermined level.

In another embodiment of the invention, the optical information recording/reproducing method further includes the step of selecting either the differential signal or the addition signal in accordance with a result of the determination, wherein the differential signal is selected when it is determined in the step of determination that the header region is being traced; and the addition signal is selected when it is determined in the step of determination that the data region is being traced.

In still another embodiment of the invention, the header region includes synchronization data for reproduction signal synchronization, and the step of determination includes the steps of: detecting a synchronization signal from the differential signal, the synchronization signal corresponding to the synchronization data; and determining that the header region is being traced when the synchronization signal is detected.

In still another embodiment of the invention, the optical information recording/reproducing method further includes the steps of: equalizing a waveform by converting the frequency characteristics of the addition signal using a first property when the addition signal is selected and by converting the frequency characteristics of the differential signal using a second property when the differential signal is selected; and digitizing a signal output in the waveform equalization step in accordance with a predetermined threshold value.

In still another embodiment of the invention, the optical information recording/reproducing method further includes the steps of: generating a demodulated signal by demodulating the digitized signal; performing an error detection process for the demodulated signal as a demodulated address when it is determined in the step of determination that the header region is being traced; and performing an error correction process for the demodulated signal as demodulated data when it is determined in the step of determination that the data region is being traced.

In still another embodiment of the invention, in the waveform equalization step, the differential signal whose frequency characteristics are converted by the second property is emphasized in its high frequency component relative to the addition signal whose frequency characteristics are converted by the first property.

Thus, the invention described herein makes possible the advantages of, in the recording/reproducing of an optical information recording medium of the intermediate address system, (1) providing an optical information recording/ reproducing device and an information recording/ reproducing method capable of securely detecting the identification data recorded in a header region; and (2) providing an optical information recording/reproducing device and an information recording/reproducing method capable of securely detecting the identification data without increasing the size of the circuitry.

These and other advantages of the present invention will become apparent to those skilled in the art upon reading and understanding the following detailed description with reference to the accompanying figures.

BRIEF DESCRIPTION OF THE DRAWINGS

FIG. 6A is a graph showing an exemplary waveform of an addition signal in an information recording/reproducing device according to one example of the present invention.

FIG. 6B is a graph showing an exemplary waveform of a differential signal in an information recording/reproducing device according to one example of the present invention.

FIG. 6C is a graph showing an exemplary waveform of an envelope detection signal in an information recording/ reproducing device according to one example of the present invention.

FIG. 14 is a block diagram illustrating a conventional optical information recording/reproducing device.

DESCRIPTION OF THE PREFERRED EMBODIMENTS

Hereinafter, the present invention will be described by way of illustrative examples while referring to the accompanying figures. Each of the following examples illustrates a case where an optical disk including a recording material of a phase-change type (which is capable of recording/ reproducing based on a change in the real reflectance) is employed and where a CAV (constant angular velocity) method is employed for controlling the rotation of the optical disk. However, the optical information recording/ reproducing device and the recording/reproducing method of the present invention are applicable to any optical information recording medium capable of optically recording/ reproducing information, e.g., a phase-change type, a magnetooptical type, or a dye type. Moreover, the device and the method of the present invention are applicable to a transmission type configuration of the recording medium as well as a reflection type configuration thereof.

EXAMPLE 1

Figure 1:
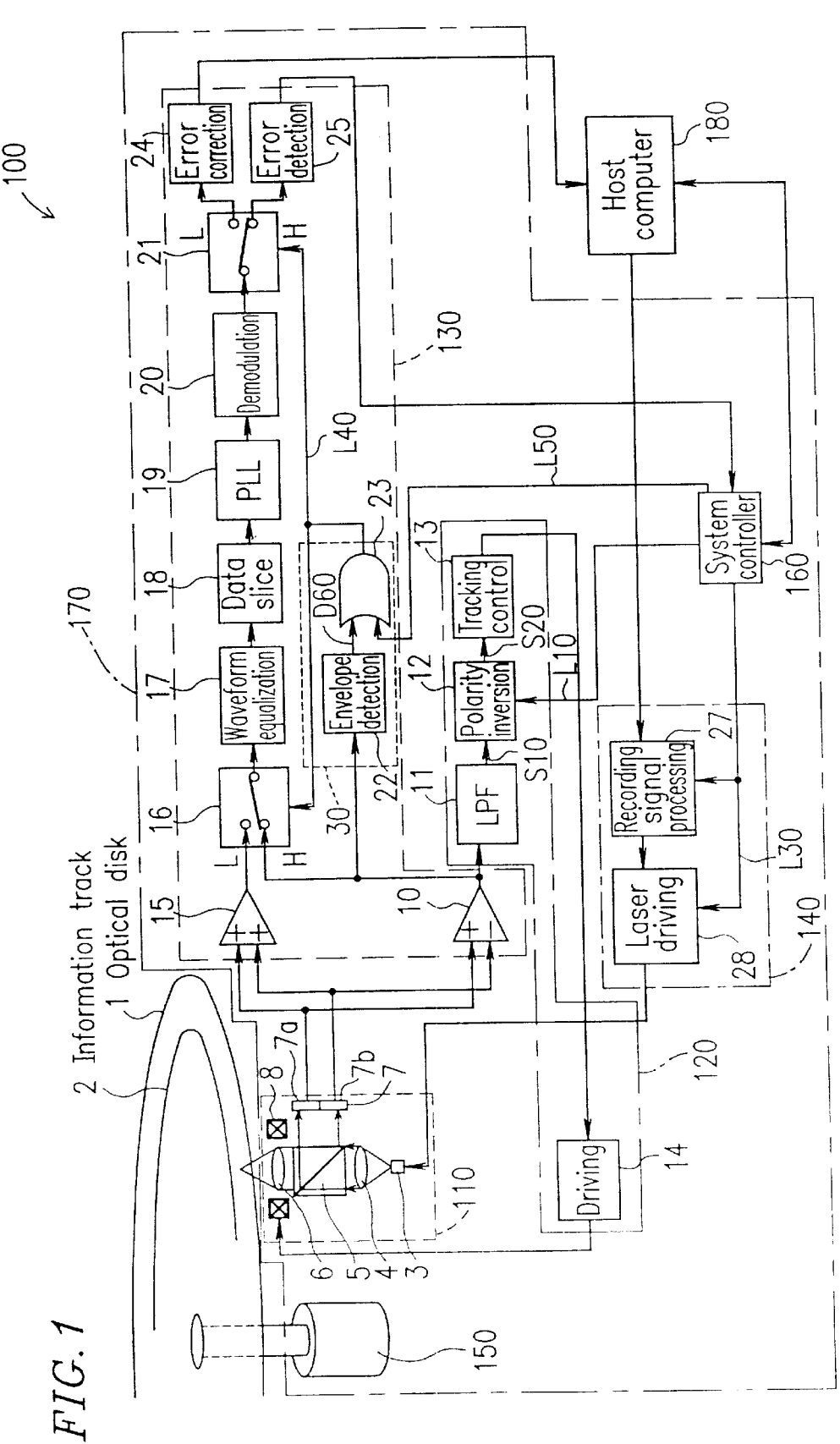
FIG. 1 is a block diagram illustrating an optical information recording/reproducing device according to one example of the present invention.

Hereinafter, an optical information recording/reproducing device according to Example 1 of the present invention will be described. FIG. 1 is a block diagram illustrating the optical information recording/reproducing device 100 of the present invention.

As shown in FIG. 1, the optical information recording/ reproducing device 100 includes an optical disk drive 170 for driving an optical disk 1 and B host computer 180. The optical disk 1 includes an information track 2 (i.e., a groove track or a land track).

The optical disk drive 170 includes an optical head 110, a tracking control/drive section 120, a reproduced signal processing section 130, a recording signal processing section 140, a spindle motor 150 for rotating the optical disk 1, and a system controller 160.

The optical head 110 includes a semiconductor laser 3, a collimation lens 4 for collimating laser light emitted from the semiconductor laser 3, a half mirror 5 located in the path of the collimated light, an objective lens 6 for converging the collimated light led through the half mirror 5 onto an information surface of the optical disk 1, and an actuator 8 supporting the objective lens 6. Thus, a beam spot is radiated on the information track 2 of the optical disk 1. The optical head 110 further includes an optical detector 7 for receiving light reflected from the optical disk 1 via the objective lens 6 and the half mirror 5. The optical detector 7 includes two light receiving portions 7a end 7b, the light receiving portions 7a and 7b defining two integral portions of the optical detector 7 divided in parallel to the direction along which the information track 2 extends. The semiconductor laser 3, the collimation lens 4, the half mirror 5, the object lens 6, the optical detector 7, and the actuator 8 are mounted on a head base (not shown), thus composing the optical head 110.

Detected signals output from the light receiving portions 7a and 7b of the optical detector 7 are input to an additive amplifier 15 and a differential amplifier 10 in the reproduced signal processing section 130. The additive amplifier 15 outputs an addition signal representing a sum of the two detected signals. The differential amplifier 10 outputs a differential signal representing a difference between the two detected signals.

The tracking control/drive section 120 includes: a low-pass filter (LPF) 11 for receiving the differential signal output from the differential amplifier 10; a polarity inversion circuit 12; a tracking control circuit 13; and a driving circuit 14. The LPF 11 subjects the differential signal from the differential amplifier 10 to a predetermined filtering process, and outputs a signal S10 to the polarity inversion circuit 12. The polarity inversion circuit 12 receives the signal S10 from the LPF 11 and a control signal L10 from the system controller 160 (described later), and outputs a signal S20 to the tracking control circuit 13. The tracking control circuit 13 receives the signal S20 from the polarity inversion circuit 12 and outputs a tracking control signal to the driving circuit 14. The driving circuit 14 receives the tracking control signal from the tracking control circuit 13 and outputs a driving current to the actuator 8.

The reproduced signal processing section 130 includes: the additive amplifier 15 for outputting en addition signal of the detected signals output from the light receiving portions 7a and 7b of the optical detector 7; the differential amplifier 10 for outputting a differential signal of the detected signals output from the light receiving portions 7a and 7b of the optical detector 7; a first selector 16 for receiving the addition signal and the differential signal and selectively outputting one of the signals; a waveform equalization circuit 17 for receiving the signal from the first selector 16 and converting the frequency characteristics thereof; a data slice circuit 18 for receiving the output of the waveform equalization circuit 17 and outputting a digitized signal; a PLL (phase locked loop) 19 for generating a reproduction clock signal which is in synchronization with the digitized signal and outputting a digital reproduced signal in synchronization with the reproduction clock signal; a demodulation circuit 20 for receiving the digital reproduced signal and outputting a demodulated signal; a second selector 21; an error correction circuit 24; and an error detection circuit 25.

The second selector 21 directs the demodulated data from the demodulation circuit 20 to a selected one of the error correction circuit 24 and the error detection circuit 25. The error correction circuit 24 performs an error correction for the received demodulated data and outputs the result as decoded data to the host computer 180. The error detection circuit 25 performs an error detection for the received demodulated data and outputs the result as address data to the system controller 160.

The reproduced signal processing section 130 further includes a header region detection section 30, which in turn includes an envelope detection circuit 22 and an OR gate 23. The envelope detection circuit 22 receives the differential signal from the differential amplifier 10 and detects an envelope thereof. The OR gate 23 receives the envelope detection signal at one terminal thereof and a control signal L50 from the system controller 160 at the other terminal thereof so as to output a control signal L40 based on the envelope detection signal and the control signal L50. The control signal L40 is supplied to the first and second selectors 16 and 21. The first selector 16 selectively outputs either the above-mentioned addition signal or the above-mentioned differential signal to the waveform equalization circuit 17 in accordance with the control signal L40. The second selector 21 selectively outputs the above-mentioned demodulated signal to either the error correction circuit 24 or the error detection circuit 25 in accordance with the control signal L40.

The recording signal processing section 140 includes a recording signal processing circuit 27 and a laser driving circuit 28. The recording signal processing circuit 27 receives information signals representing e.g., digital video/audio and computer data from the host computer 180 and a control signal L30 from the system controller 160, and outputs data to be recorded to the laser driving circuit 28. The laser driving circuit 28 receives the control signal L30 (from the system controller 160) and the data to be recorded (from the recording signal processing circuit 27) and outputs a driving current to the semiconductor laser 3.

The system controller 160 receives the address data from the error detection circuit 25 and controls the inputting/outputting of control data to/from the host computer 180. The system controller 160 also outputs the control signals L10, L30, and L50 for controlling the polarity inversion circuit 12, the recording signal processing circuit 27, the laser driving circuit 28, and the OR gate 23.

The host computer 180, located external to the optical disk drive 170, controls the inputting/outputting information signals representing e.g., digital video/audio or computer data from the host computer 180 as well as control data.

Figure 2A:
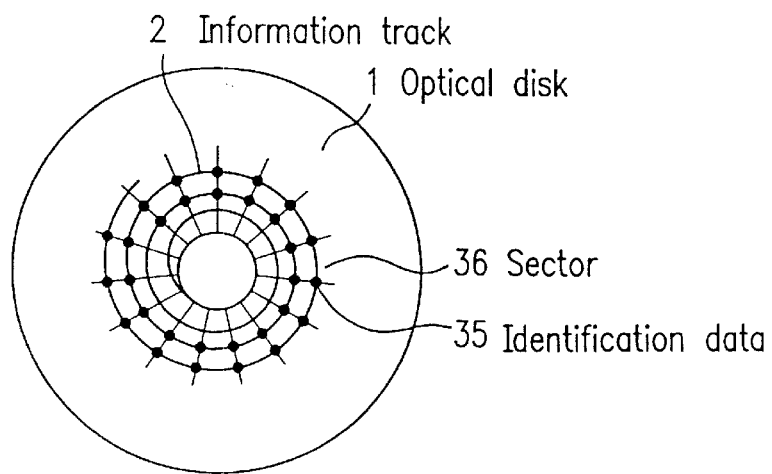
FIGS. 2A and 2B are diagrams schematically illustrating an optical disk to be employed for an optical information recording/reproducing device according to one example of the present invention.
Figure 2B:
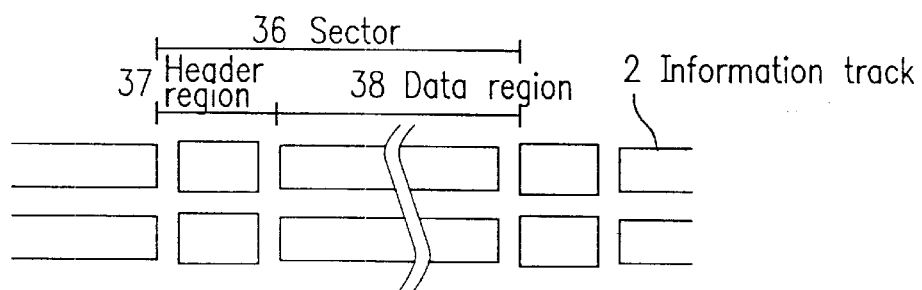

FIGS. 2A and 2B are schematic diagrams showing the structure of the optical disk 1 employed in the present example. As shown in FIG. 2A, information tracks 2 are formed in a spiral or concentric shape on the optical disk 1. In accordance with a predetermined physical format, a plurality of sectors 36 are contiguously provided along the information tracks 2 on the optical disk 1. The sectors 36 define the units of information to which access can be made for recording or reproducing information. As shown in FIG. 2B, each sector 36 includes a header region 37 for recording identification data (indicating the location of the sector on the optical disk 1) and a data region 38 for recording user data. The identification data and the user data are appropriately modulated to provide signals that can be suitably recorded on the optical disk 1. In the present example, it is assumed that the identification data and the user data are modulated by the same modulation method.

Figure 3:
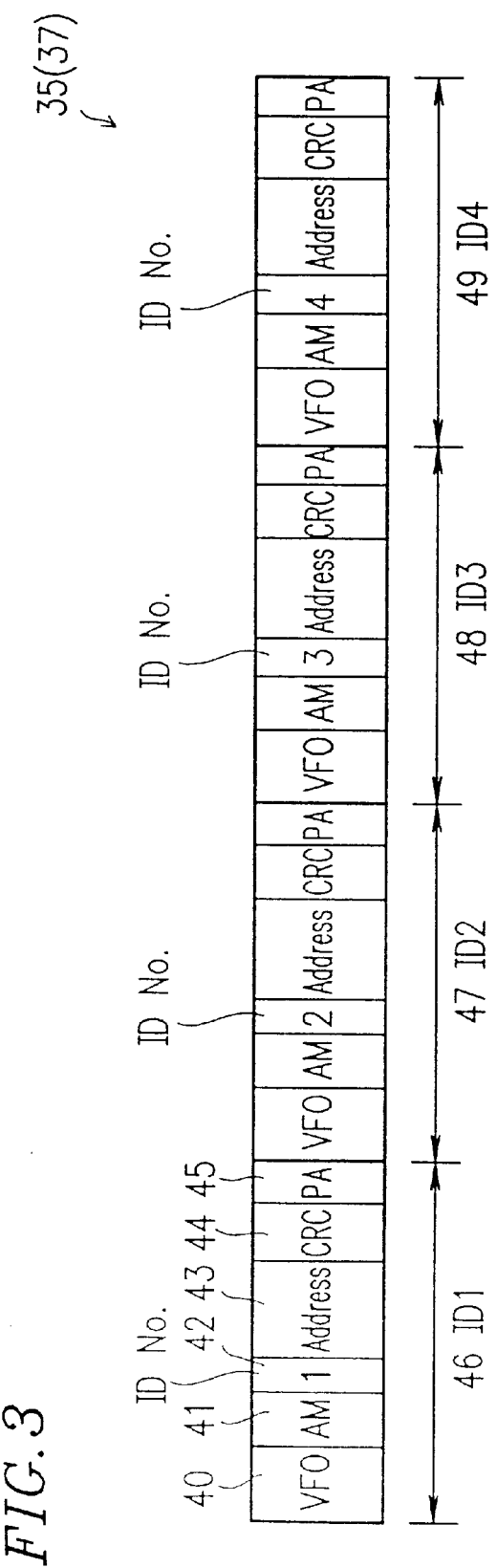
FIG. 3 is a diagram illustrating an exemplary logical format of identification data in a header region of an optical disk employed for an optical information recording/ reproducing device according to one example of the present invention.

FIG. 3 shows an exemplary logical format of the identification data 35 (header region 37). As shown in FIG. 3, the identification data 35 (header region 37) includes four address blocks 46 to 49. In the illustrated exemplary case, a sector address 43 is recorded in each address block, so that four sector addresses are provided corresponding to the address blocks 46 to 49, as indicated by ID1 to ID4, respectively (these ID numbers indicate the location order of the address blocks in the relevant address region).

Each of the address blocks 46 to 49 includes a synchronization signal 40 (commonly referred to as "VFO"), an address mark (AM) 41, an ID number 42, a sector address number 43, a cyclic redundancy check (CRC) 44, and a postamble (PA) 45.

The VFO 40 is a data including a continuous repetition pattern for securing the reproduction of an address signal in spite of possible variations in the rotation of the optical disk 1. By locking the PLL 19 to the pattern provided by the VFO 40, a clock for reading data is generated. The AM 41 is composed of a special code pattern indicating the beginning of the address data (address number 43). The ID number 42 indicates the ordinal number of each address block (i.e., 1 to 4 in this example). The address number 43 is a data indicating the location of the sector 36 on the optical disk 1. The CRC 44 is an error detection code generated from the address number 43 and the ID number 42. The PA 45 is used for flexibly accommodating any excess portion of the word length overflowing the CRC region 44 after the modulation of the error detection code.

Although the above-described address blocks 46 to 49 are directed to the minimum information required by the present example, the address blocks 46 to 49 can also contain additional information as appropriate.

Figure 4:
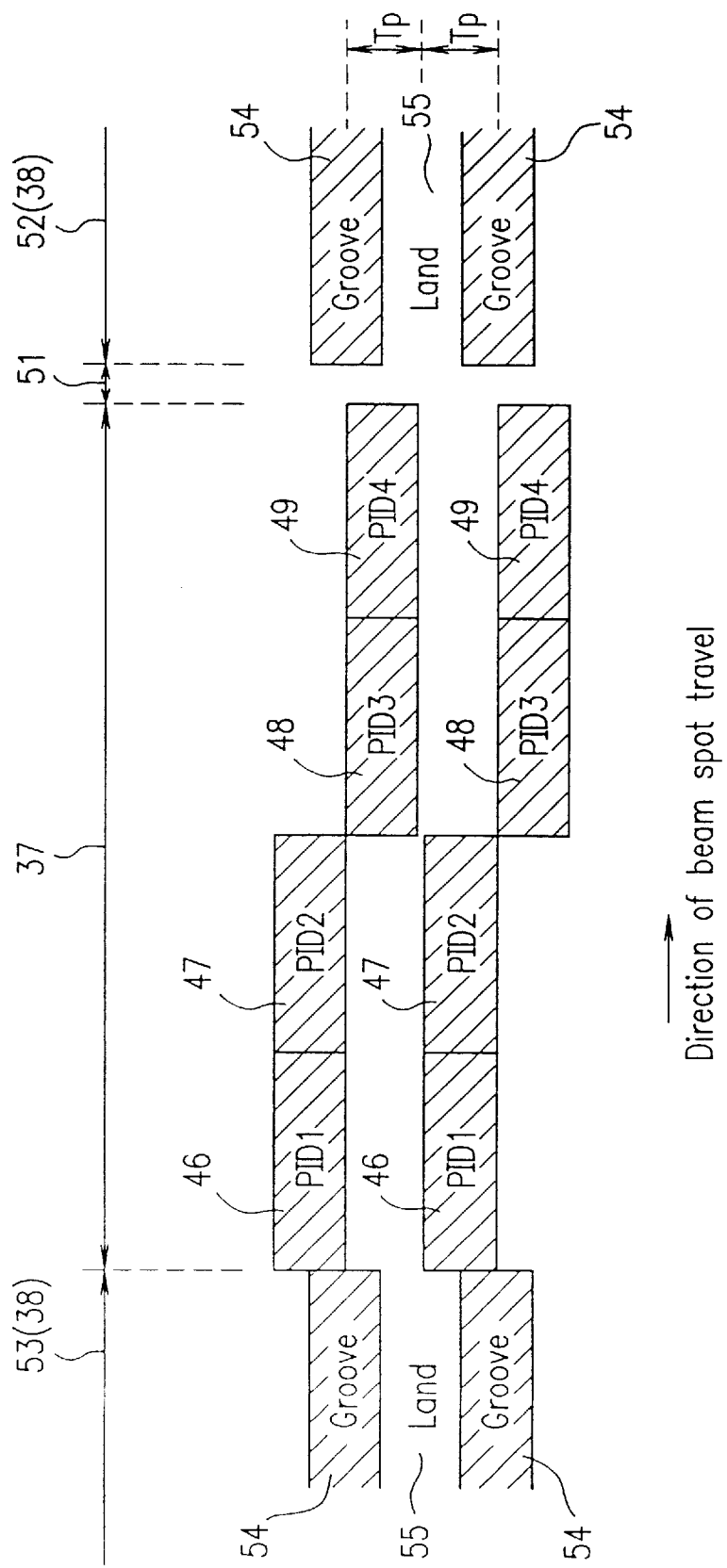
FIG. 4 is a diagram showing the locations of address blocks in a header region of an optical disk employed for an optical information recording/reproducing device according to one example of the present invention.

FIG. 4 is a diagram illustrating the physical locations of the address blocks 46 to 49 (in the header region 37) on the optical disk 1. The horizontal direction in FIG. 4 represents the direction along which the information tracks 2 extend, whereas the vertical direction in FIG. 4 represents the radius direction of the optical disk 1. For the sake of illustration, the diagram of FIG. 4 is overly reduced in size along the track direction relative to the radius direction of the optical disk 1. It is assumed that the beam spot (not shown) traces in a direction from the left to the right in the figure. The information tracks 2 include alternating groove tracks 54 and land tracks 55.

As shown in FIG. 4, a mirror region 51 is formed between the header region 37 and the subsequent data region 38 of one sector 36. Furthermore, the beginning of the data region 38 defines a gap region 52. The end of the data region 38 of an immediately preceding sector of the sector 36 defines a buffer region 53. The information track 2 (i.e., groove track 54 or land track 55) extends throughout the gap region 52 and the buffer region 53. The header region 37 includes four address blocks 46 to 49 (numbered as PID1 to PID4, respectively). The actual address blocks are in the form of pre-pits.

As seen from FIG. 4, the address blocks PID1 and PID2 are wobbled away from the center line of the groove track 54, so as to be on the left side of the direction of travel of the beam spot; the address blocks PID3 and PID4 are wobbled toward the right side of the direction of travel of the beam spot. Furthermore, the respective center lines of the address blocks PID1 and PID2 are located on the left boundary (with respect to the direction of the beam travel) of the corresponding groove track 54; the respective center lines of the address blocks PID3 and PID4 are located on the right boundary (with respect to the direction of the beam travel) of the corresponding groove track 54. Therefore, as described in more detail below, the pre-pits forming the address blocks PID1 to PID4 are wobbled by half (½) the track pitch from the center line of the corresponding groove track 54.

Herein it is assumed that the track pitch, which is defined as the distance Tp from the center line of one information track (groove or land) to the center line of another information track adjoining the information track along the radius direction, is substantially equal to the width of each information track. As seen from FIG. 4, the distance from the center line of each address block (e.g., 46) to that of a corresponding address block that adjoins the address block along the radius direction (defined as "the pitch of the address blocks with the same ID number along the radius direction") is twice as large as the track pitch (i.e., 2 Tp).

Figure 5:
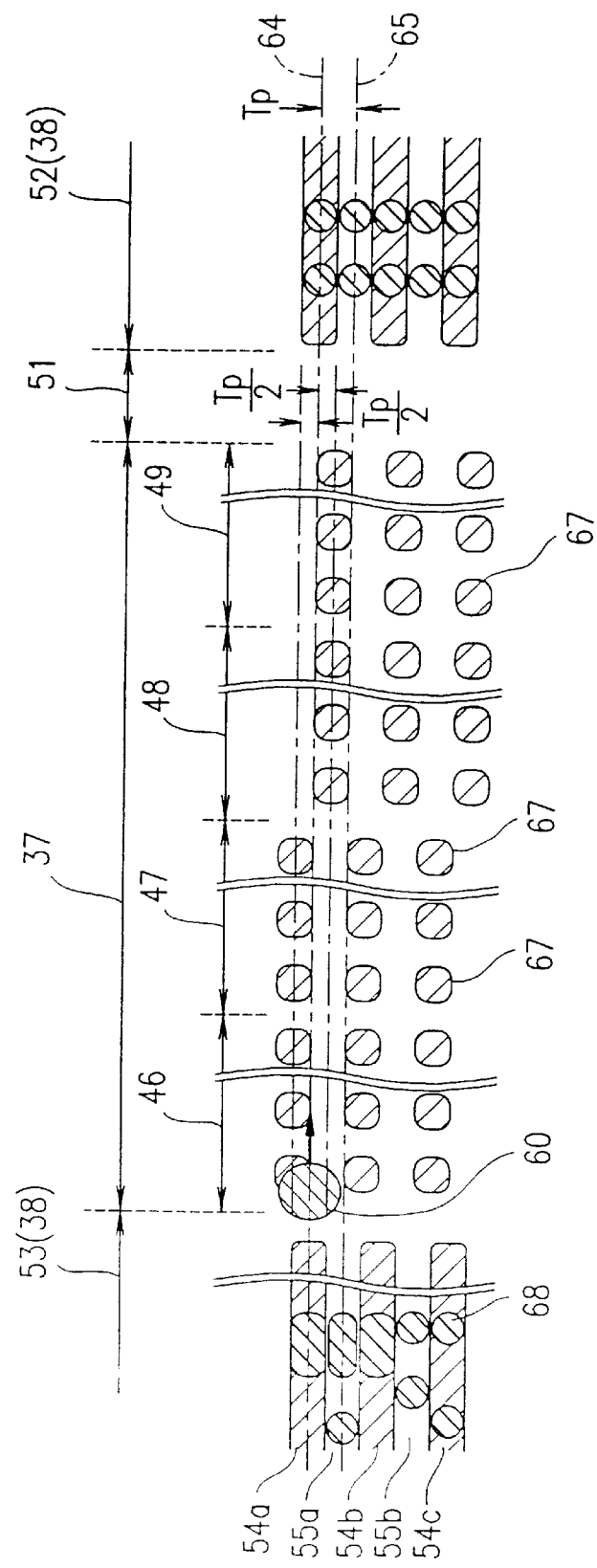
FIG. 5 is a magnified plan view showing the vicinity of the header region of the optical disk in FIG. 4.

FIG. 5 is a magnified plan view showing the vicinity of the header region 37. As shown in FIG. 5, groove tracks 54 (54a to 54c) and land tracks 55 (55a to 55b) are alternately formed as the information tracks 2. Reference numerals 64 and 65 denote the center lines of the groove track 54 and the land track 55, respectively. Information (user data) is recorded in the form of rewritable recording marks 68 in the data region 38, whereas information (identification data) is recorded in the form of pre-pits 67 in the header region 37. The beam spot 60 is expected to travel on the center line of the information track to be traced, along the direction indicated by the arrow (→).

As seen from FIG. 5, in the header region 37, the address blocks PID1, PID2, PID3, and PID4 are formed of the pre-pits 67, corresponding to address blocks 46, 47, 48, and 49, respectively. The address blocks PID1 and PID2 are wobbled away from the center line of the corresponding information track (i.e., the groove track 54) so as to be on the left side of the direction of travel of the beam spot 60, the address blocks PID3 and PID4 are wobbled toward the right side of the direction of travel of the beam spot 60. The address blocks PID1 to PID4 are wobbled by half (½) the track pitch from the center line of the corresponding groove track 54.

No pre-pits or grooves are formed in the mirror region 51. The groove track 54 and land track 55 are formed through the data region 3B. In the data region 38, recording marks 68 are formed by modifying the optical characteristics (e.g., reflection characteristics) of the recording layer of the optical disk 1 in accordance with user data such as video/audio or computer data. For example, the recording marks 68 can be formed as amorphous portions against unrecorded portions in crystalline state.

As seen from FIG. 5, the pre-pits 67 indicating the identification data are formed between the center lines 64 of the groove tracks 54 and the center lines 65 of the land tracks 55. The width of the pre-pits 67 along the radius direction is substantially equal to the width of the information tracks. In every groove track 54, the pre-pits 67 in the address blocks ID1 and ID2 are disposed so as to be wobbled toward the left side of the direction of travel of the beam spot, whereas the pre-pits 67 in the address blocks ID3 and ID4 are disposed so as to be wobbled toward the right side of the direction of travel of the beam spot. Accordingly, the distance between the centers of two adjoining pre-pits 67 along the radius direction in the header region 37 is twice as large as the track pitch (i.e., 2 Tp). The pitch 2 Tp is defined as the "pre-pit pitch". Since the width of the pre-pits 67 along the radius direction is substantially equal to the information track width (i.e., the track pitch Tp), it will be understood that the header region 37 includes pre-pits 67 and a land region having a width equal to one track pitch Tp alternately formed along the radius direction.

Therefore, when the beam spot 60 travels over the header region 37, a portion of the beam spot 60 passes over the pre-pits 67 regardless of whether the groove track 54 or the land track 55 is being traced, so that the amount of reflected light from the beam spot 60 is somehow modulated by the pre-pits 67. As a result, the identification data (i.e., location information) is securely obtained regardless of whether the groove track 54 or the land track 55 is being traced.

Hereinafter, the operations of the optical Information recording/reproducing device 100 having the above-described structure will be described, referring back to FIG. 1.

First, the operation of reading information on the optical disk 1 will be described.

The host computer 180 issues a command indicating a reproduction mode to the system controller 160. In response to the command indicating a reproduction mode, the system controller 160 supplies the control signal L30 to the laser driving circuit 28. Thus, the laser driving circuit 28 is placed in a reproduction mode and outputs a driving current to the semiconductor laser 3 so that the semiconductor laser 3 is driven to emit a light beam at a predetermined intensity.

Next, the position of the beam spot 60 along the focusing direction is controlled. It is assumed herein that a common focusing control method such as the astigmatic method is employed, and the description thereof is omitted.

A laser beam emitted from the semiconductor laser 3 is collimated by the collimation lens 4, led through the beam splitter (half mirror) 5, and converged onto the optical disk 1 by the objective lens 6. A light beam reflected from the surface of the optical disk 1, which is diffracted (and hence resulting in a certain distribution of reflected light) in accordance with the information carried on the information track 2, is led through the objective lens 6 to be incident on the optical detector 7 via the beam splitter 5.

The light receiving portions 7a and 7b of the optical detector 7 convert the variation in the intensity distribution of the incident light beam into electric signals (i.e., electric currents), and output the electric signals to the differential amplifier 10 and the additive amplifier 15. The differential amplifier 10 converts the input currents from the light receiving portions 7a and 7b into voltage signals, and then derives a difference therebetween which is output as a differential signal to the LPF 11.

The LPF 11 extracts the low frequency component from the differential signal, and outputs the low frequency component as the signal S10 to the polarity inversion circuit 12. In accordance with the control signal L10 input from the system controller 160, the polarity inversion circuit 12 may allow the signal S10 to pass or invert the polarities (i.e., plus or minus) thereof. As a result, the signal S20 is output to the tracking control circuit 13. The signal S20 is a so-called "radial push-pull signal" which corresponds to the radial tracking error amount between the beam spot 60 converged on the information surface of the optical disk 1 and the information track 2.

It is assumed herein that the signal S10 is allowed to pass (without being inverted) in the case where the "target" information track 2 is a groove track 54 and that the signal S10 is inverted in the case where the target information track 2 is a land track 55.

The tracking control circuit 13 outputs a tracking control signal to the driving circuit 14 based on a level of the input signal S20. The driving circuit 14 supplies a driving current to the actuator 8 in accordance with the tracking control signal, whereby the position of the objective lens 6 along the direction across the information track 2 is controlled. As a result, the beam spot 60 properly scans on the information track 2.

Once the beam spot 60 is accurately positioned on the information track 2 of the optical disk 1, the envelope detection circuit 22 performs an envelope detection for the differential signal that is always output from the differential amplifier 10. As the beam spot 60 begins to trace the header region 37 as shown in FIG. 5, the envelope signal exceeds a predetermined threshold value. Thus, the envelope detection circuit 22 detects the envelope of the differential signal and outputs an envelope detection signal D60 (which is a digital signal at the High level) to the OR gate 23. In other words, the header region 37 is detected through the detection of the envelope of the differential signal.

The OR gate 23 derives a logical OR of the envelope detection signal D60 and the control signal L50 from the system controller 160 and accordingly places the control signal L40 at the High level, which is output to the first and second selectors 16 and 21. When the control signal L40 is at the High level, the first selector 16 couples the differential amplifier 10 to the waveform equalization circuit 17 so that the differential signal is input to the waveform equalization circuit 17. The waveform equalization circuit 17 modulates the differential signal so as to emphasize its high frequency component, thereby reducing inter-symbol interference in the differential signal. The data slice circuit 18 converts the modulated signal into a signal sequence of "0" and "1" (i.e., a digitized signal) by digitizing the modulated differential signal at a predetermined slice level. The PLL 19 extracts the data and the reproduction clock from the digitized signal, the data being output as a digital reproduced signal to the demodulation circuit 20.

The demodulation circuit 20 demodulates the reproduced digital data so that the digital reproduced signal is converted into a demodulated address which can be suitably processed outside the optical information recording/reproducing device, which is output to the second selector 21. The second selector 21 couples the demodulation circuit 20 to the error detection circuit 25 when the control signal L40 is at the High level, thereby coupling the demodulated address to the error detection circuit 25. The error detection circuit 25 determines whether or not the demodulated address includes an error, and in the absence of such errors outputs the demodulated address as address data to the system controller 160.

Based on the received address data, the system controller 160 performs functions such as access, reproduction, or recording. The system controller 160 holds the control signal L50 at the low level before receiving the address data. However, once the address data is received, the system controller 160 periodically places the control signal L50 at the High level for a period of time corresponding to the length of the header region 37 (hereinafter this period is referred to as "$T_{MD}$"). This cycle (hereinafter referred to as "$T_{sc}$") is equal to the time required by the beam spot 60 for tracing one sector.

Thus, the first and second selectors 16 and 21 are periodically switched, whereby it becomes possible to detect the identification data (address blocks ID1 to ID4), periodically appearing in the differential signal, without fail.

Now, the principle which enables reading the identification data based on the differential signal and the principle which enables detecting the header region based on the detection of the envelope of the differential signal will be described in detail. Since the differential signal is a radial push-pull signal, the signal is not modulated by the recording marks 68 on the center line of the information track 2 as long as the light beam 60 is properly tracing the center line of the information track 2 (as opposed to off-tracking). Therefore, the differential signal is at a substantially zero level while tracing in the data region 38.

On the contrary, in the header region 37, the center of the beam spot 60 traces on an imaginary line which is shifted by ¼ of the pre-pit pitch from the center of the row of pre-pits 67, as shown in FIG. 5. Therefore, the differential signal receives the largest amount of modulation by the pre-pits 67 while tracing in the header region 37 because such a differential signal corresponds to a radial push-pull signal in the case where a groove which is discontinuously formed in accordance with a bit sequence of "1" and "0" of the identification data is traced with an off-track amount equivalent to ¼ of the groove pitch.

Thus, the header region 37 can be detected by detecting the envelope of the differential signal and thereby detecting a period of high signal level. The envelope detection circuit 22 can be implemented as, for example, a low-pass filter having a sufficiently long time constant relative to the frequency band width of the identification data.

FIGS. 6A, 68, and 6C illustrate exemplary waveforms of the addition signal output from the additive amplifier 15, the differential signal output from the differential amplifier 10, and the envelope detection signal, respectively, in the case where the beam spot 60 traces along the center line 64 of the groove track 54 in FIG. 5. Since the addition signal is modulated by both the recording marks 68 and the pre-pits 67, the addition signal has a non-zero output level in both the data region 38 and the header region 37, as shown in FIG. 6A. Since the beam spot 60 traces the groove track 54 while being off-tracked by half the track pitch (Tp/2) from the center line of the pre-pits 67, the amount of modulation which the addition signal receives within the header region 37 is not substantially larger than the amount of modulation which the addition signal receives within the data region 38.

On the other hand, the differential signal is not modulated by the recording marks 68, which are provided along the center line of the groove track 54, unless the beam spot 60 is in an off-track state. Therefore, as shown in FIG. 6B, the output amplitude of the differential signal in the data region 38 is substantially zero. Moreover, the differential signal receives the largest amount of modulation while the beam spot 60 is off-tracked by ¼ of the pre-pit pitch from the center line of the pre-pits 67. Therefore, the modulation amount of the differential signal in the header region 37 is larger than that of the addition signal (FIG. 6A). Since the address blocks PID1 and PID2 are wobbled in the opposite direction with respect to the address blocks PID3 and PID4, the differential signal takes correspondingly opposite polarities.

FIG. 6C shows a result of the envelope detection applied to the differential signal shown in FIG. 6B. As shown in FIG. 6C, the output of the envelope detection circuit 22 is at the High level while the differential signal exhibits an amplitude modulation pattern due to the identification data.

As the beam spot 60 reaches the mirror region 51 or the gap region 52 (data region 38) in a predetermined period of time $T_{MD}$ after the detection of the header region 37 (see FIG. 5), as described above, the envelope of the differential signal is at a substantially zero level, so that the output of the envelope detection circuit 22 shifts to the Low level.

Referring back to FIG. 1, the output D60 of the envelope detection circuit 22 shifts to the Low level. Since the control signal L50 from the system controller 160 also shifts to the Low level at this time, the control signal L40 from the OR circuit 23 also shifts to the Low level. As a result, the input terminal of the first selector 16 is decoupled from the output of the differential amplifier 10 and instead coupled to the output of the additive amplifier 15. At the same time, the output terminal of the second selector 21 is decoupled from the error detection circuit 25 and instead coupled to the error correction circuit 24.

While tracing in the data region 38, the amount of reflected light from the beam spot 60 decreases due to the presence of the recording marks 68, so that the outputs from the light receiving portions 7a and 7b decrease. On the other hand, in the absence of the recording marks 68, the amount of reflected light from the beam spot 60 increases so that the outputs from the light receiving portions 7a and 7b increase. The output signals from the light receiving portions 7a and 7b, which correspond to the amount of reflected light, are added by the additive amplifier 15 so as to be output as an addition signal to the waveform equalization circuit 17 via the first selector 16.

Since the identification data in the header region 37 and the user data in the data region 38 are modulated by the same modulation method in the present example, the waveform equalization circuit 17, the data slice circuit 18, the PLL 19 and the demodulation circuit 20 can process the addition signal in a manner similar to processing the differential signal. The addition signal is converted by the demodulation circuit 20 into a demodulated signal, which is output to the error correction circuit 24 via the second selector 21. The error correction circuit 24 corrects any error present in the demodulated signal and outputs the result as demodulated data to the host computer 180.

On the other hand, in the operation of recording information on the optical disk 1, the system controller 160 outputs the control signal L30, thereby indicating a recording mode to the recording signal processing circuit 27 and the laser driving circuit 28. The host computer 180 outputs the information to be recorded (e.g., digitalized video/audio data and computer data) as recording data to the recording signal processing circuit 27. The recording signal processing circuit 27 adds an error correction code to the received recording data, and modulates the recording data for recording synchronization, whereby the modulated recording data is output to the laser driving circuit 28 as modulated data to be recorded.

While the optical information recording/reproducing device is placed in the recording mode by the control signal L30, the laser driving circuit 28 modulates the driving current that is applied to the semiconductor laser 3 in accordance with the received recording data. As a result, the intensity of the beam spot 60 radiated on the optical disk 1 varies in accordance with the recording data, so that recording marks 68 are formed on the optical disk 1 which are in accordance with the recording data.

During the above-described operations, the spindle motor 150 rotates the optical disk 1 at a constant angular or linear velocity.

Next, the data format according to the present example is described in more detail.

Figures 7A, 7B, 7C, 7D, 7E:
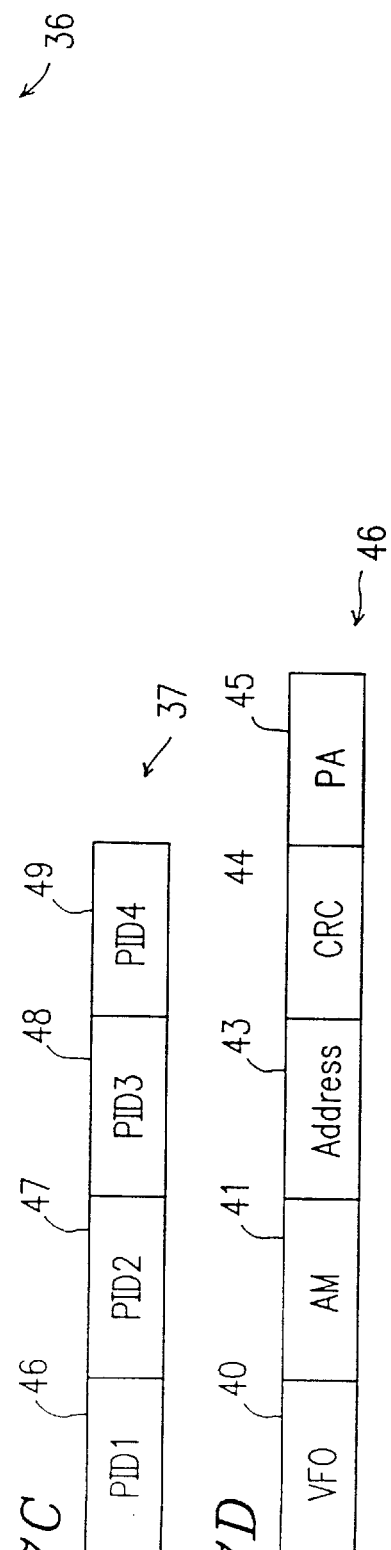
FIGS. 7A to 7E are diagrams showing an exemplary sector format of an optical disk employed for an optical information recording/reproducing device according to one example of the present invention.

FIGS. 7A to 7E are diagrams illustrating an exemplary sector format of the optical disk 1 according to the present example. As mentioned above, one complete round of the information track 2 on the optical disk 1 is divided into a plurality of sectors 36. It is assumed that the information track 2 is divided into a number n of sectors as shown in FIG. 7A. As shown in FIG. 7B, each sector 36 includes a header region 37, a mirror region 51, a gap region 52, a first preamble region (VFO) 57, a main information region 58, a guard data region 59, and a buffer region 53.

The header region 37, which is also referred to as an "identification signal region", includes pre-pits formed therein. The mirror region 51 is defined as a region where no pre-pits or grooves are formed. It is possible to control the amount of the light to be radiated on the optical disk 1 by detecting the amount of reflected light from the berm spot incident on the mirror region 51 (serving as a reference light amount). The gap region 52, the first preamble region (VFO) 57, the main information region 58, the guard data region 59, and the buffer region 53 define a data region 38, constituting either a groove track or a land track. The gap region 52 is provided in order to secure a certain time margin for permitting signal processing after the beam spot has passed the header region 37 (identification data region) and before the beam spot reaches the first preamble region 57. The first preamble region 57, which is also referred to as a "VFO", includes recording marks at a single period for generating a synchronization clock for the reproduction of the data recorded in the main information region 58. Subsequent to the recording marks recorded in the main information region 58 is the guard data region 59, where dummy data are recorded in the form of recording marks. In the case where a large number of rewriting or recording have been performed, the dummy data prevents damage due to a thermal load that may begin in one end of a series of recording marks from reaching the main information region 58 on the recording layer of the optical disk. The buffer region 53 is provided for accommodating the entire series of recording marks within the data region in case the series of recording marks per sector becomes excessively long by a rotation speed error, in particular a faster speed than the predetermined speed of the spindle motor 150.

As shown in FIG. 7C, the header region 37 includes four address blocks PID1, PID2, PID3, and PID4. As shown in FIG. 7D, each address block includes a second preamble region 40, an address mark (AM) region 41, an identification information (address) region 43, an error detection code (CRC) region 44, and a postamble region 45 (corresponding respectively to the VFO 40, the AM 41, the Address 43, the CRC 44, and the PA 45 in FIG. 3).

Furthermore, as shown in FIG. 7E, the identification information region 43 includes a sector information section and an absolute address number section. The sector information includes flags indicating a PID number, the kind of zone (e.g., lead-in, lead-out, or rewritable zone), the kind of sector (e.g., reproduction only or rewritable), and the like. The absolute address number is the sector number.

Figure 8A:
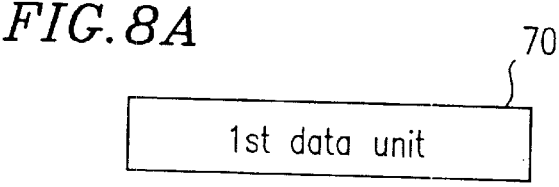
FIGS. 8A to 8C are diagrams showing an exemplary structure of a first data unit.
Figure 8B:
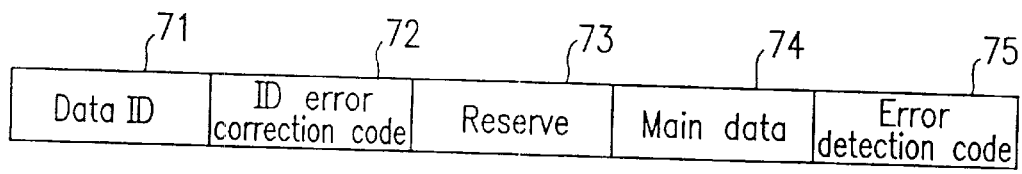
Figure 8C:
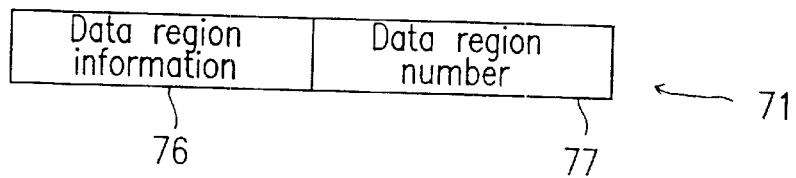

The information to be recorded in the main information region is generated through the following signal process: First, as shown in FIG. 8B, 2048 bytes of main data 74, data ID 71, an error correction code 72 for the data ID, reserve information data 73, and an error detection code 75 for the reserve information data 73, are added to each sector, for example. The components 71 to 75 are collectively referred to as a first data unit 70 (FIG. 8A). The data within the first data unit 70 is scrambled.

Next, Reed Solomon's error correction code is added to a block consisting of 16 first data units 70 after scrambling, resulting in 16 second data units. Finally, the data in each second data unit is subjected to a 8–16 modulation, where 8 bits/symbol data is converted into 16 channel bits according to predetermined rules. Thereafter, a synchronization pattern is inserted into the second data units to give 16 third data unite. The third data units are recorded in the main information region 58 (FIG. 7B).

The data ID 71 includes data region information 76 and a data region number 77. The data region information 76 can include, for example, flags indicating the kind of information track (e.g., groove track or land track), the kind of zone (e.g., lead-in, lead-out, or rewritable zone), the kind of data (e.g., reproduction only or rewritable), and the like. The data region number 77 is identical with the above-mentioned absolute address number.

As described above, the optical information recording/reproducing device 100 according to the present example employs an optical information recording medium having a header region (including pre-pits 67 representing identification data) which includes a plurality of address blocks (four address blocks 46 to 49) alternately wobbled toward the inner periphery or the outer periphery along the radius direction of the optical disk. As a result, even if the beam spot 60 goes off-track, the beam spot 60 will approach one of the address blocks wobbled toward the inner periphery or the outer periphery so that the identification data represented by the pre-pits 67 in the approached address block can be securely detected.

Furthermore, in accordance with the optical information recording/reproducing device 100 of the present example, the information recorded in the header region 37 (i.e., rows of pre-pits 67 which are wobbled by substantially ½ of the track pitch Tp from the center line of the information track 2 along the radius direction) is reproduced by using a differential signal between two outputs obtained from the light receiving portions 7a and 7b of the optical detector 7. The amplitude of the differential signal is larger than the amplitude of the addition signal of the two outputs from the light receiving portions 7a and 7b of the optical detector 7. Since data is recorded in the data region 38 in the form of recording marks 68 disposed along the center line of the information track 2, the differential signal is at a substantially zero level during the reproduction of the data region 38. As a result, no digital reproduced signal is generated due to the differential signal while reproducing the data in the data region 38, thereby making a clear distinction between the header region 37 and the data region 38, leading to an improved detection accuracy of the header region 37. Furthermore, the increased amplitude of the differential signal also increases the reading accuracy of the identification data.

Furthermore, the differential signal is free from modulation by the recording marks 68 and is only modulated by the pre-pits 67. As a result, the header region 37 can be detected simply by detecting the envelope of the differential signal by means of the envelope detection circuit 22.

As mentioned above, the header region 37 is detected by detecting the envelope of the differential signal, i.e., without reading the pattern of the identification data recorded in the header region 37. Therefore, it is possible to detect the header region 37 before achieving synchronization with the identification data, thereby determining whether the header region 37 or the data region 38 is being reproduced. Based on the result of determination, either the differential signal or the addition signal can be appropriately selected as a reproduced signal to be subjected to processes such as waveform equalization, digitization (data slicing), synchronization (PLL), and demodulation. As a result, the waveform equalization circuit 17, the data slice circuit 18, the PLL 19, and the demodulation circuit 20 can be shared for both the differential signal (as appropriate for the reproduction of the header region 37) and the addition signal (as appropriate for the reproduction of the data region 38). That is, there is no need to incorporate two sets of such circuitry, i.e., one for the header region and one for the data region, thereby reducing the scale of circuitry.

Furthermore, according to the present example, the header region 37 can still be detected through the envelope detection even if the identification data (VFO) includes an error.

EXAMPLE 2

Figure 9:
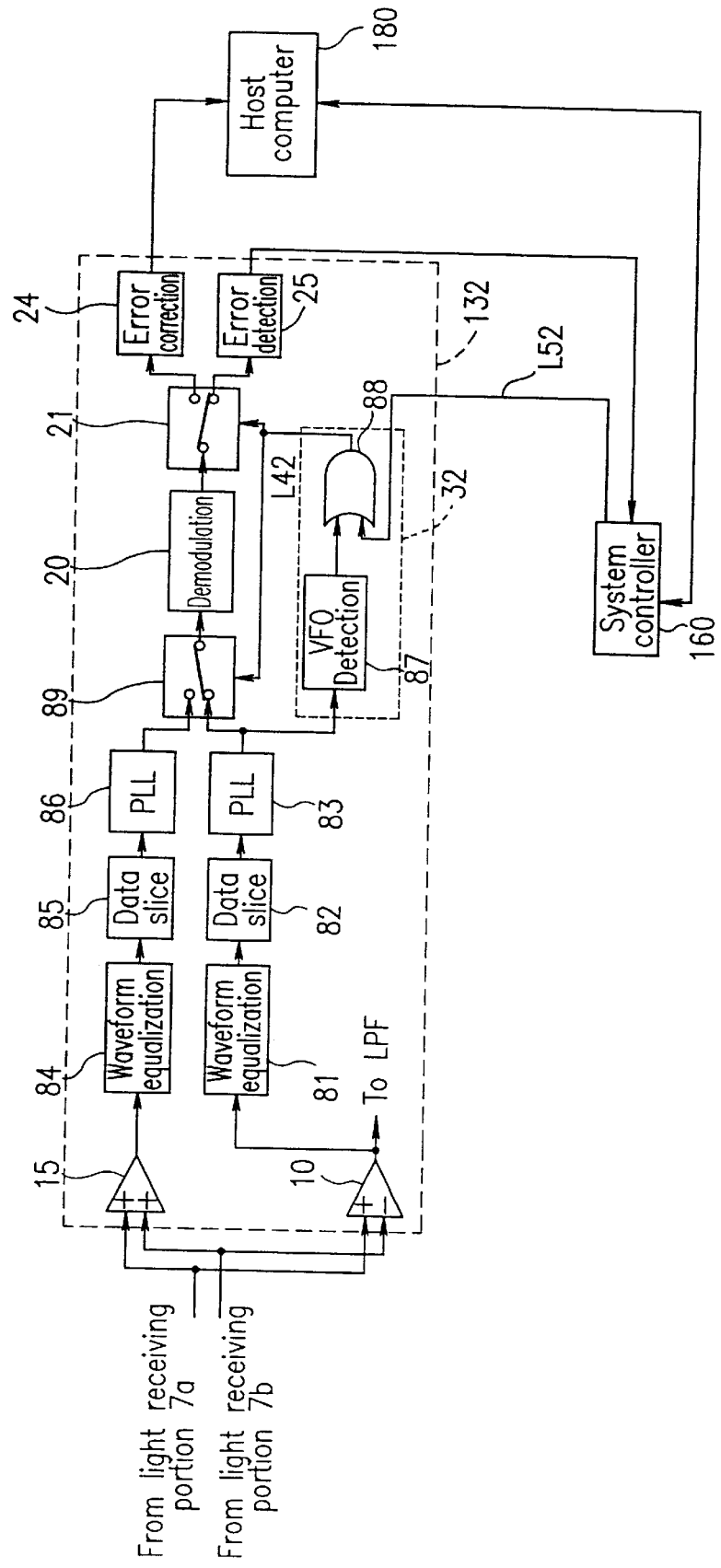
FIG. 9 is a block diagram illustrating the vicinity of a reproduced signal processing section of an optical information recording/reproducing device according to another example of the present invention.

FIG. 9 is a block diagram illustrating the vicinity of a reproduced signal processing section 132 of an optical information recording/reproducing device according to Example 2 of the present invention. In FIG. 9, the constituent elements which also appear in the optical information recording/reproducing device 100 of Example 1 (shown in FIG. 1) are indicated by the same reference numerals as used therein, with the description thereof being omitted.

As shown in FIG. 9, the reproduced signal processing section 132 includes: an additive amplifier 15 for outputting an addition signal of the detected signals output from light receiving portions 7a and 7b of an optical detector 7; a differential amplifier 10 for outputting a differential signal of the detected signals output from the light receiving portions 7a and 7b of the optical detector 7; a first waveform equalization circuit 81 for receiving the differential signal from the differential amplifier 10 and converting the frequency characteristics thereof; a first data slice circuit 82 for receiving the output of the first waveform equalization circuit 81 and outputting a digitized signal; a first PLL 83 for generating a reproduction clock signal which is in synchronization with the digitized signal from the first data slice circuit 82 and outputting a first digital reproduced signal in synchronization with the reproduction clock signal; a second waveform equalization circuit 84 for receiving the addition signal from the additive amplifier 15 and converting the frequency characteristics thereof; a second data slice circuit 85 for receiving the output of the second waveform equalization circuit 84 and outputting a digitized signal; a second PLL 86 for generating a reproduction clock signal which is in synchronization with the digitized signal from the second data slice circuit 85 and outputting a second digital reproduced signal in synchronization with the reproduction clock signal; a third selector 89 for receiving the first and second digital signals and selectively outputting one of the signals; a demodulation circuit 20 for receiving the digital reproduced signal from the third selector 89 and outputting a demodulated signal; a second selector 21; an error correction circuit 24; and an error detection circuit 25.

It should be noted that the reproduced signal processing section 132 according to the present example includes no "first" selector. The "second" selector as defined herein is named after the second selector 21 in the optical information recording/reproducing device 100 of Example 1 due to its similar function; the "third" selector 89 defines a further selector.

The second selector 21 directs the demodulated data from the demodulation circuit 20 to a selected one of the error correction circuit 24 and the error detection circuit 25. The error correction circuit 24 performs an error correction for the received demodulated data and outputs the result as decoded data to the host computer 180. The error detection circuit 25 performs an error detection for the received demodulated data and outputs the result as address data to the system controller 160.

The reproduced signal processing section 132 further includes a VFO detection section 32, which in turn includes a VFO detection circuit 87 and an OR gate 88. The VFO detection circuit 87 receives the first digital reproduced signal from the first PLL 83 and, upon detection of a VFO, outputs a VFO detection signal. The OR gate 88 receives the VFO detection signal from the VFO detection circuit 87 at one terminal thereof and a control signal L52 from the system controller 160 at the other terminal thereof 80 as to output a control signal L42 based on the VFO detection signal and the control signal L52. The control signal L42 is supplied to the second and third selectors 21 and 89. The third selector 89 selectively outputs either the first or second digital reproduced signal to the demodulation circuit 20 in accordance with the control signal L42. The second selector 21 selectively outputs the demodulated signal from the demodulation circuit 20 to either the error correction circuit 24 or the error detection circuit 25 in accordance with the control signal L42.

Otherwise the optical information recording/reproducing device of the present example has the same structure as that of the optical information recording/reproducing device 100 of Example 1 (FIG. 1).

Next, the operations of optical information recording/reproducing device of the present example will be described mainly in points where they differ from the operations of the optical information recording/reproducing device 100 of Example 1 (FIG. 1).

The differential signal output from the differential amplifier 10 is converted into the first digital signal (via the first waveform equalization circuit 81, the first data slice circuit 82, and the first PLL 83), which is output to the VFO detection circuit 87 and the third selector 89. The VFO detection circuit 87 monitors the signal sequence output from the first PLL 83 for a VFO component. As a beam spot 60 begins to trace the header region 37, a VFO component present in the beginning portion of an address block 46 appears in the differential signal. Upon detecting the VFO component, the VFO detection circuit 87 outputs an VFO detection signal (which is a digital signal at the High level) to the OR gate 88. In other words, the header region is detected by detecting the VFO component in the differential signal by means of the VFO detection circuit 87, according to the present example.

The OR gate 88 derives a logical OR of the VFO detection signal and the control signal L52 from the system controller 160 and accordingly places the control signal L42 at the High level, which is output to the second and third selectors 21 and 89. When the control signal L42 is at the High level, the third selector 89 couples the output of the first PLL 83 to the demodulation circuit 20 so that the first digital reproduced signal (derived from the differential signal) is input to the demodulation circuit 20. The demodulation circuit 20 converts the first digital signal into a demodulated address, which is output to the error detection circuit 25 via the second selector 21.

The system controller 160 issues the control signal L52 to the OR gate 88, and periodically switches the second and third selectors 21 and 89, thereby smoothly detecting the header region 37 by means of the VFO detection circuit 87. Specifically, the VFO component can be detected by, for example, counting the cycles of the first digital reproduced signal output from the first PLL 83 by using the reading clock (also output from the first PLL 83). Since the VFO is essentially a repetition of a pattern with a cycle which is N times the clock (where N represents a predetermined integer), the VFO can be detected by counting the repetition cycle N.

When tracing the data region 38, no VFO component is detected in the differential signal, so that the output of the VFO detection circuit 87 is at the Low level. Since the control signal L52 from the system controller 160 also shifts to the Low level at this time after the predetermined time period $T_{MD}$, the control signal L42 from the OR circuit 88 also shifts to the Low level. As a result, the input terminal of the third selector 89 is decoupled from the output of the first PLL 83 and instead coupled to the output of the second PLL 86. At the same time, the output terminal of the second selector 21 is decoupled from the error detection circuit 25 and instead coupled to the error correction circuit 24.

The addition signal from the addition circuit is processed by the second waveform equalization circuit 84, the second data slice circuit 85, the second PLL 86, and the demodulation circuit 20 process in a manner similar to processing the differential signal. The processed addition signal is thus output to the error correction circuit 24 via the second selector 21 as demodulated data.

As described above, in accordance with the optical information recording/reproducing device of the present example, the header region 37 can be securely detected by detecting the VFO component in the differential signal by means of the VFO detection circuit 87.

Although the present example described a case where the VFO component is detected by using a reproduction clock output from the first PLL 83, it is also possible to count the repetition clock N of the VFO component from the digitized signal output from the first data slice circuit 82 by using an internal clock utilized by the system controller 160 and the like. In this case, the first and second PLLs 83 and 86 can be implemented as one PLL.

In the present example, the pattern characteristically indicating the VFO 40 (exemplified in FIG. 7D) is detected by the VFO detection circuit 87. In accordance with the 8–16 modulation of the DVD specification, for example, the pattern characteristically indicating the VFO 40 is a repetition of a single signal such as 3 T, where T represents a channel bit (note that the minimum mark length, i.e., pit length, is 3 T).

Instead of employing a configuration for detecting a pattern characteristically indicating the VFO 40, it is also possible to employ an AM detection circuit for detecting a pattern characteristically indicating the address mark (AM) 41. In this cases, the address marks are only present in the header region 37, hence eliminating the possibility of misdetecting the data region 38 for the header region 37. Thus, an even more reliable detection is ensured. The header region 37 can be securely detected, taking note of the fact that a compound pattern including a 12 T-pattern or larger cannot exist in areas other than the header region 37 because the longest pattern according to the 8–16 modulation configuration is 11 T, which allows the length of the pattern to range between 3 T to 11 T.

EXAMPLE 3

Figure 10:
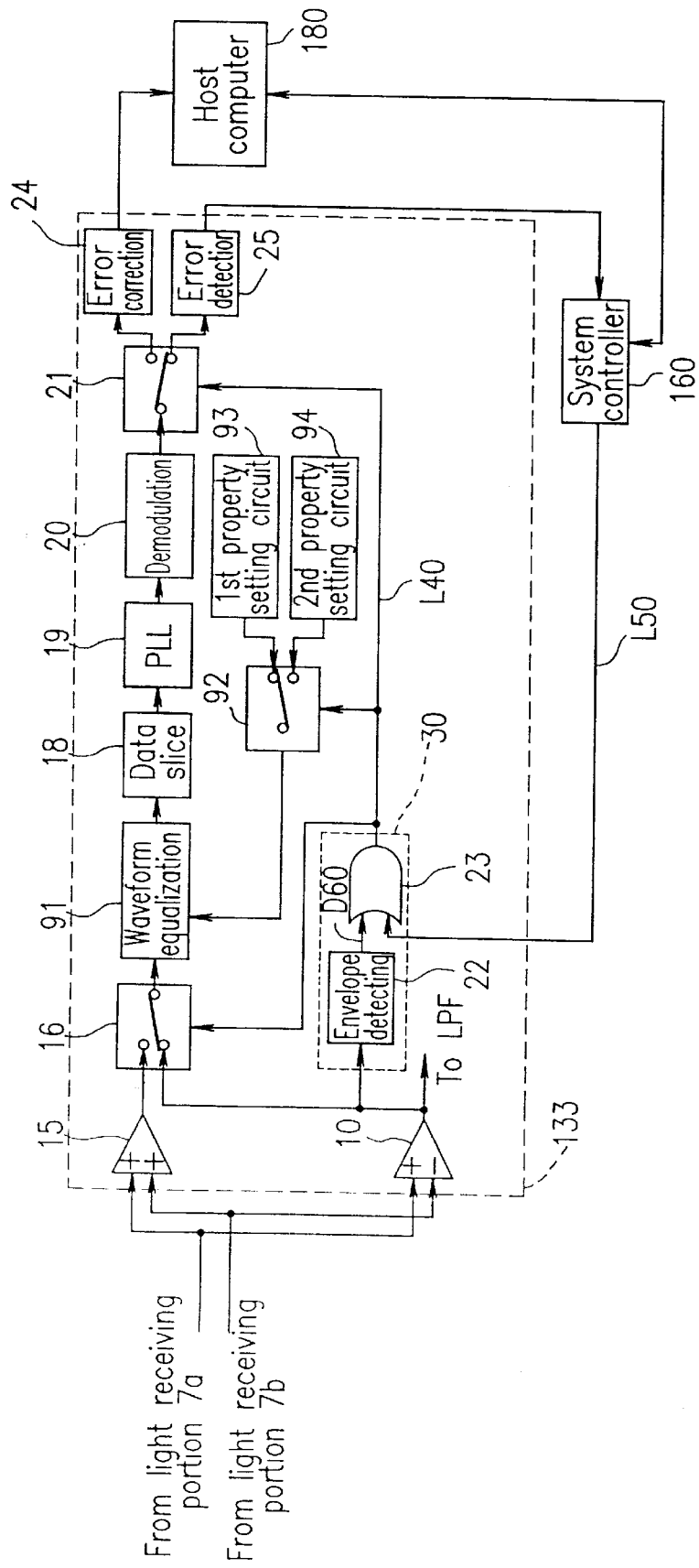
FIG. 10 is a block diagram illustrating the vicinity of a reproduced signal processing section of an optical information recording/reproducing device according to still another example of the present invention.

FIG. 10 is a block diagram illustrating the vicinity of a reproduced signal processing section 133 of an optical information recording/reproducing device according to Example 3 of the present invention. In FIG. 10, the constituent elements which also appear in the optical information recording/reproducing device 100 of Example 1 (shown in FIG. 1) are indicated by the same reference numerals as used therein, with the description thereof being omitted.

As shown in FIG. 10, the reproduced signal processing section 133 includes: an additive amplifier 15 for outputting an addition signal of the detected signals output from light receiving portions 7a and 7b of an optical detector 7; a differential amplifier 10 for outputting a differential signal of the detected signals output from the light receiving portions 7a and 7b of the optical detector 7; a header region detection section 30 including an envelope detection circuit 22 for receiving the differential signal from the differential amplifier 10 and detecting the envelope thereof and an OR gate 23; a first selector 16 for outputting a selected one of the received addition signal and the received differential signals; a third waveform equalization circuit 91 for receiving the signal from the first selector 16 and converting the frequency characteristics thereof: a data slice circuit 18 for receiving the output of the third waveform equalization circuit 91 and outputting a digitized signal; a PLL 19 for generating a reproduction clock signal which is in synchronization with the digitized signal and outputting a digital reproduced signal in synchronization with the reproduction clock signal: a demodulation circuit 20 for receiving the digital reproduced signal and outputting a demodulated signal; a second selector 21; an error correction circuit 24; and an error detection circuit 25. The second selector 21 directs the demodulated data from the demodulation circuit 20 to a selected one of the error correction circuit 24 and the error detection circuit 25. The error correction circuit 24 performs an error correction for the received demodulated data and outputs the result as decoded data to the host computer 180. The error detection circuit 25 performs an error detection for the received demodulated data and outputs the result as address data to the system controller 160.

The reproduced signal processing section 133 further includes a fourth selector 92, a first property setting circuit 93, and a second property setting circuit 94.

It should be noted that the reproduced signal processing section 133 according to the present example includes no "third" selector. The "first" and "second" selectors 16 and 21 as defined herein are named after the first and second selectors 16 and 21 in the optical information recording/reproducing device 100 of Example 1 due to their similar functions; the "fourth" selector 92 defines a further selector to the "first" and "second" selectors 16 and 21.

It should also be noted that the reproduced signal processing section 133 according to the present example includes no "first" or "second" waveform equalization circuits. The "third" waveform equalization circuit 91 is so named due to its distinct function from the first or second waveform equalization circuit described in Example 1 or 2.

In the present example, the OR gate 23 receives an envelope detection signal D60 from the envelope detection circuit 22 at one terminal thereof and a control signal L50 from the system controller 160 at the other terminal thereof so as to output a control signal L40 based on the envelope detection signal and the control signal L50. The control signal L40 is supplied to the first, second and fourth selectors 16, 21, and 92. The first selector 16 outputs a selected one of the addition signal and the differential signal to the third waveform equalization circuit 91 in accordance with the control signal L40. The fourth selector 92 outputs, in accordance with the control signal L40, a selected one of a first setting signal (received at one terminal from the first property setting circuit 93) and a second setting signal (received at another terminal from the second property setting circuit 94) to the third waveform equalization circuit 91 as a property setting signal. In accordance with the property setting signal received from the fourth selector 92, the third waveform equalization circuit 91 converts the frequency characteristics of the differential signal or the addition signal received from the first selector 16.

Otherwise the optical information recording/reproducing device of the present example has the same structure as that of the optical information recording/reproducing device 100 of Example 1 (FIG. 1).

Next, the operations of optical information recording/reproducing device of the present example will be described mainly in points where they differ from the operations of the optical information recording/reproducing device 100 of Example 1 (FIG. 1).

If the envelope detection section 30 (i.e., the envelope detection circuit 22 and the OR gate 23) detects the header region 37 and the control signal L40 output from the OR gate 23 shifts to the High level, the first selector 16 selects the differential amplifier 10 for its input, and the second selector 21 selects the error detection circuit 25 for its output. At the same time, the fourth selector 92 couples the first setting signal, which is supplied from the first property setting circuit 93, to the third waveform equalization circuit 91 as the property setting signal.

The third waveform equalization circuit 91 transforms its input signal so as to emphasize its high frequency component, thereby reducing inter-symbol interference, the degree of emphasis being varied in accordance with the received property setting signal. In this case, the third waveform equalization circuit 91 transforms the received differential signal so as to apply a first emphasis ratio to its high frequency component in accordance with the first setting signal. This provides the differential signal with an adequate and sufficient waveform equalization effect.

Furthermore, the waveform-equalized differential signal is demodulated via the data slice circuit 18, the PLL 19, and the demodulation circuit 20, so as to be output as a demodulated address to the error detection circuit 25 via the second selector 21.

As the beam spot begins to trace the data region 38, causing the control signal L40 to shift to the Low level as described above, the first selector 16 selects the additive amplifier 15 for its input, and the second selector 21 selects the error correction circuit 24 for its output. At the same time, the fourth selector 92 couples the second setting signal (which is supplied from the second property setting circuit 94) to the third waveform equalization circuit 91 as the property setting signal. In accordance with the second setting signal, the third waveform equalization circuit 91 transforms the received addition signal so as to apply a second emphasis ratio to its high frequency component. This provides the addition signal with an adequate waveform equalization effect.

Furthermore, the waveform-equalized addition signal is demodulated via the data slice circuit 18, the PLL 19, and the demodulation circuit 20, so as to be output as demodulated data to the error correction circuit 24 via the second selector 21.

The first and second emphasis ratios are prescribed as follows. As shown in FIG. 5, the differential signal output from the differential amplifier 10 while reproducing the header region 37 is equivalent to a modulated signal obtained from the beam spot 60 being off-tracked from the center line of the pre-pits 67 by half the track pitch (i.e., ½ Tp). Therefore, the characteristics of the reproduced differential signal exhibit a substantial decrease in the high components as compared with the frequency characteristics of an addition signal output from the additive amplifier 15 when the beam spot 60 is properly (i.e., on-the-track) scanning on the recording marks 68 in the data region 38. Accordingly, by prescribing the first emphasis ratio to be larger than the second emphasis ratio, the differential signal and the addition signal are adequately waveform-equalized, whereby the jittering of the reproduced signal can be decreased.

Figure 11:
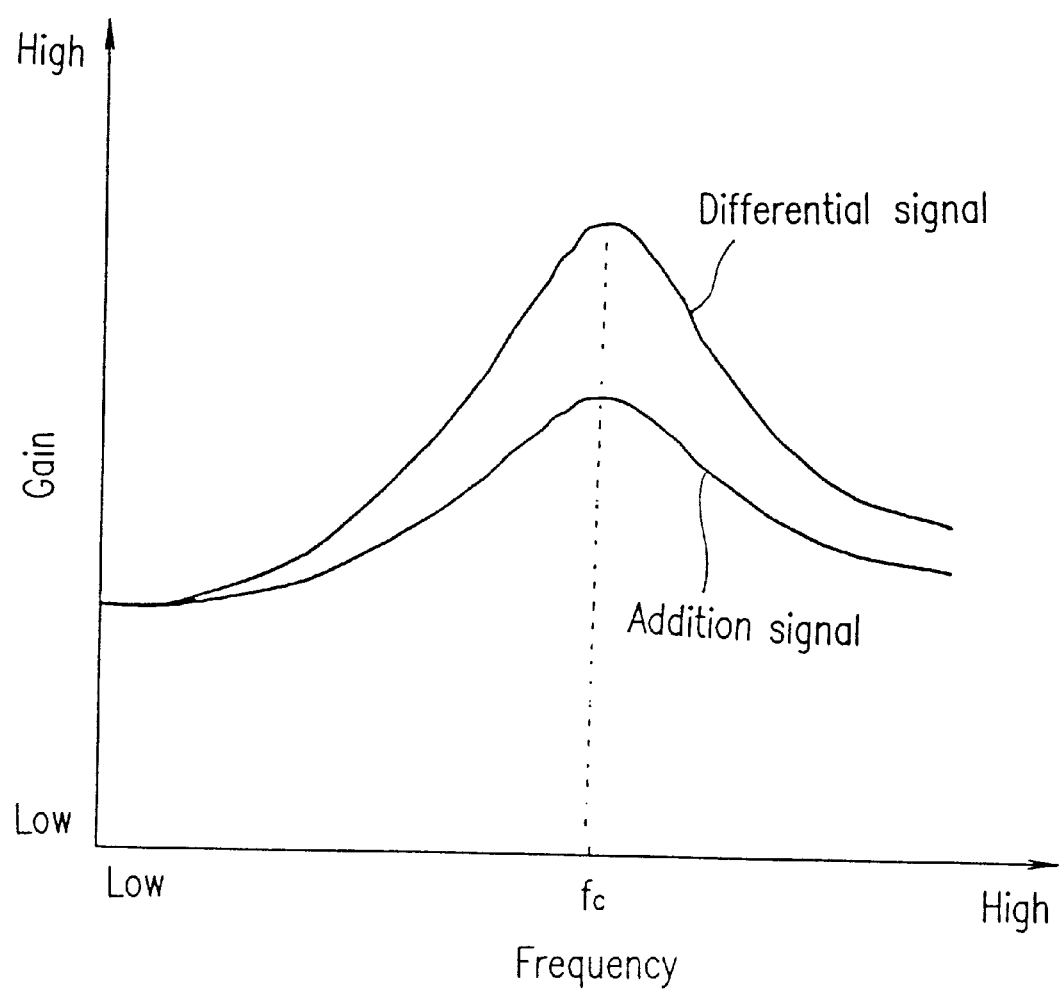
FIG. 11 is a graph showing the frequency characteristics of a waveform equalization circuit of the reproduced signal processing section of the optical information recording/ reproducing device shown in FIG. 10.
Figure 12A:
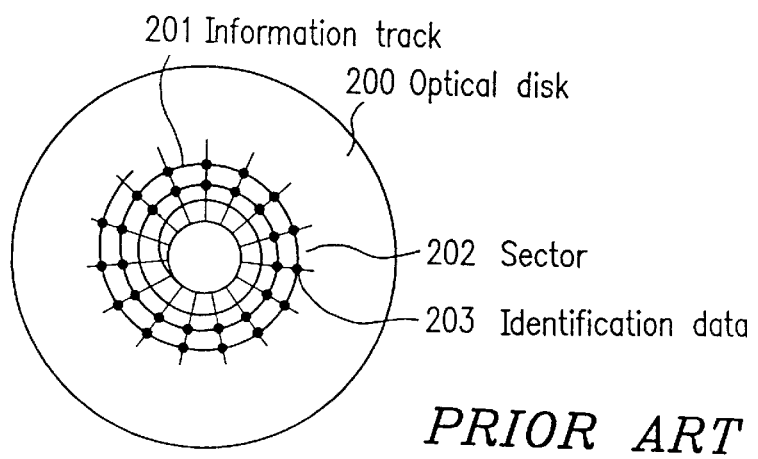
FIGS. 12A and 12B are diagrams illustrating an optical disk having a conventional sector format.
Figure 12B:
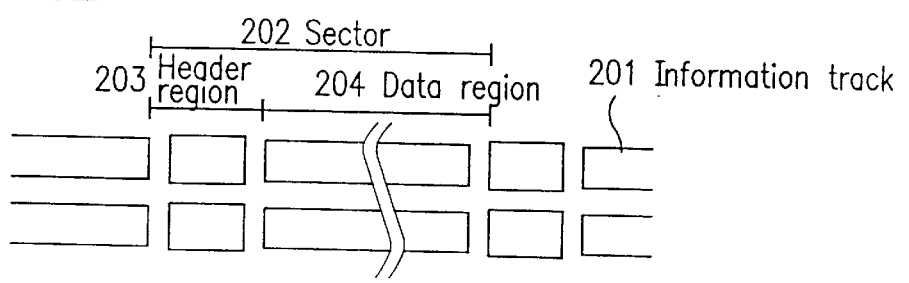
Figure 13:
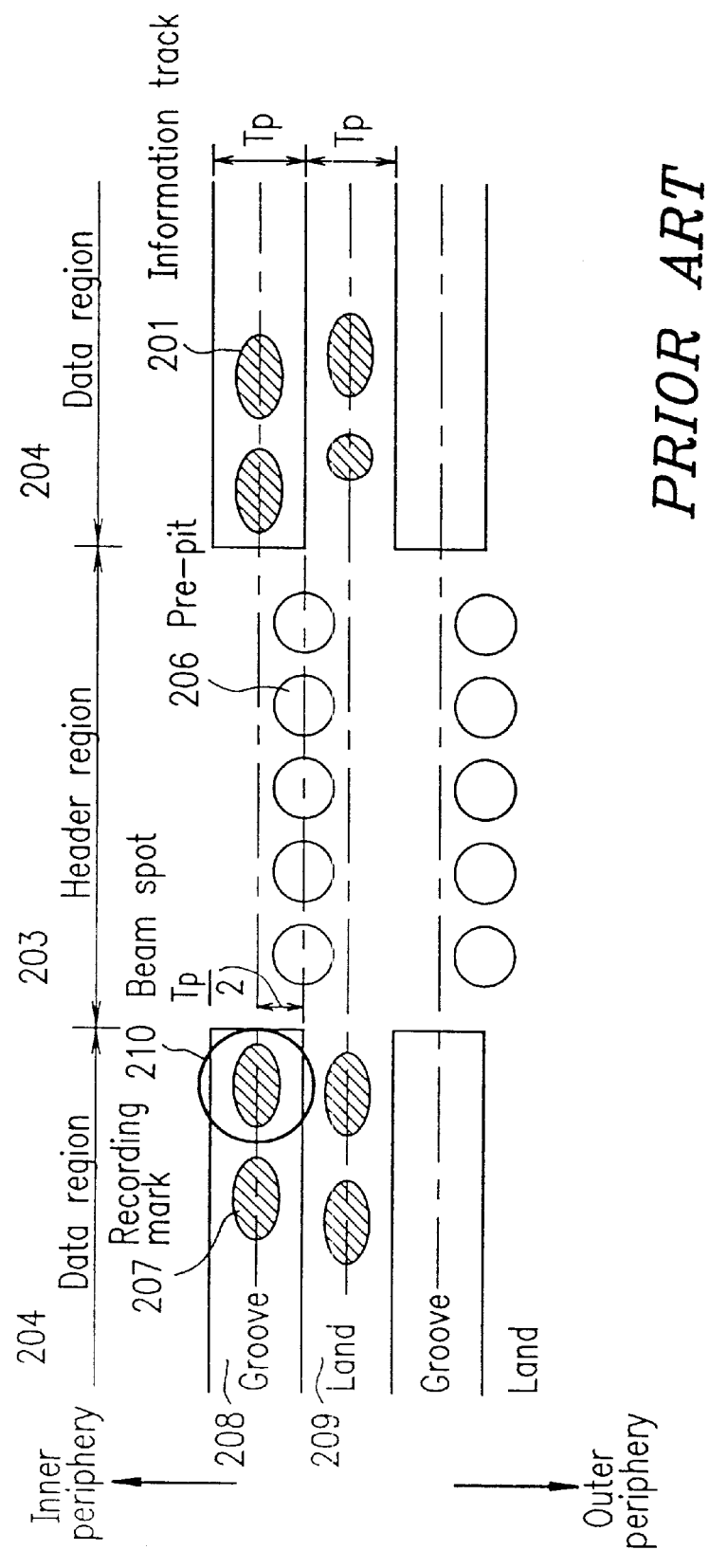
FIG. 13 is a magnified view showing a header region of a conventional optical disk.

FIG. 11 illustrates exemplary frequency characteristics of the third waveform equalization circuit 91 as applied to the differential signal or the addition signal. It should be noted that, since the identification data in the header region 37 and the user data in the data region 38 are modulated by the same modulation method in the present example, the central frequency of emphasis is identical in both the differential signal and the addition signal.

As described above, in accordance with the optical information recording/reproducing device of the present example, the third waveform equalization circuit 91 applies different emphasis ratios for the high frequency component of the input signal, depending on whether the input signal is the differential signal or the addition signal. As a result, both the differential signal and the addition signal can be adequately waveform-equalized, so that the jittering of the reproduced signal can be decreased and the reproduction margin increased.

Moreover, according to the present example, the header region 37 is detected through an envelope detection, before even performing a waveform equalization for the detected signal (which may be the addition signal or the differential'signal). Since this makes it possible to apply a selected emphasis ratio for the waveform equalization process depending on whether the signal is the differential signal or the addition signal, the reliability of the VFO detection for the sake of synchronization, for example, can be enhanced, whereby the accuracy of identification data reproduction and user data reproduction increases.

As shown in FIGS. 2A and 2B, the optical disk employed in the optical information recording/reproducing device of the present example includes groove tracks and land tracks that are formed in a continuous spiral shape. However, the present invention is not limited to such configuration of the information tracks. For example, the above-described Examples are also applicable to an optical disk disclosed in FIG. 1 of Japanese Laid-Open Patent Publication No.7-29185, where a groove track or a land track is alternately formed in each complete round of the optical disk.

In accordance with the optical information recording/reproducing devices described in the above-Examples, excellent signal quality can be obtained by employing an optical disk having a groove pitch of about 1.48 $\mu$m and a recording bit length of about 0.4 $\mu$m/bit and a recording/reproducing optical system including a laser with a laser wavelength of about 650 nm and an objective lens with a numerical aperture of about 0.6. The track pitch Tp under these conditions is derived to be about 0.74 $\mu$m because both the land tracks and the groove tracks are considered and utilized as information tracks.

As for the material of the optical disk substrate, glass, polycarbonate, acryl, and the like can be suitably used.

As described above, the optical information recording/reproducing device and the optical information recording/reproducing method according to the present invention employs an optical information recording medium having a header region (including pre-pits representing identification data) which includes a plurality of address blocks alternately wobbled toward the inner periphery or the outer periphery along the radius direction of the optical disk. As a result, even if the beam spot goes off-track, the beam spot will approach one of the address blocks wobbled toward the inner periphery or the outer periphery so that the identification data represented by the pre-pits in the approached address block can be securely detected.

Furthermore, in accordance with the optical information recording/reproducing device end method of the present example, the information recorded in the header region (i.e., rows of pre-pits which are wobbled by substantially ½ of the track pitch from the center line of the information track along the radius direction) is reproduced by using a differential signal between two outputs obtained from the light receiving portions 7a and 7b of the optical detector. The amplitude of the differential signal is larger than the amplitude of the addition signal of the two outputs from the light receiving portions of the optical detector. Since data in a data region is recorded in the form of recording marks disposed along the center line of the information track, the differential signal is at a substantially zero level during the reproduction of the data region. As a result, no digital reproduced signal is generated due to the differential signal while reproducing the data in the data region, thereby making a clear distinction between the header region and the data region, leading to an improved detection accuracy of the header region. Furthermore, the amplitude of the differential signal is increased so that the reading accuracy of the identification data itself also improves.

In the case where the header region is detected by detecting the envelope of the differential signal, the detection of the header region can be made without reading the pattern of the identification data recorded in the header region. Therefore, it is possible to detect the header region before achieving synchronization with the identification data, thereby determining whether the header region or the data region is being reproduced. Based on the result of determination, either the differential signal (as appropriate for the reproduction of the header region) or the addition signal (as appropriate for the reproduction of the data region) can be selected as a reproduced signal to be subjected to processes such as waveform equalization, digitization (data slicing), synchronization (PLL), and demodulation. As a result, there is no need to incorporate two sets (i.e., one for the header region and one for the data region) each including a waveform equalization circuit, a data slice circuit, a PLL, and a demodulation circuit, thereby reducing the scale of circuitry.

Furthermore, the differential signal is free from modulation by the information in the data region (which is recorded in the form of recording marks disposed along the track center) and is only modulated by identification data in the header region (which is recorded in the form of pre-pits). As a result, the header region can be detected simply by detecting the envelope of the differential signal. The header region can also be easily detected by detecting within the differential signal a synchronization signal that characteristically indicates the header region.

Furthermore, in the case where the header region is detected by detecting the envelope of the differential signal, the determination as to whether or not the header region is being reproduced can be made before waveform equalization. This makes it possible to perform optimum waveform equalization for the differential signal (for reproducing the header region) and the addition signal (for reproducing the data region) in accordance with their respective reproduced frequency characteristics, thereby increasing the reading accuracy of the identification data in the header region. In particular, the frequency characteristics of the differential signal exhibit a decrease in the high components as compared with the frequency characteristics of the addition signal. Accordingly, by prescribing a larger emphasis ratio for the high frequency component of the differential signal than for that of the addition signal, the differential signal is also adequately waveform-equalized, thereby preventing digitization errors and increasing the reading accuracy of the identification data.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical information recording/reproducing device for recording, reproducing, or erasing information on an optical information recording medium by radiating a light beam on the optical information recording medium, the optical information recording medium comprising information tracks formed in a spiral or concentric shape on a disk substrate, the information tracks including groove tracks and land tracks alternating with each other, each information track including:

a header region for recording identification data in the form of pre-pits, the identification data representing location information on the disk substrate; and a data region for recording user data, the pre-pits being grouped into blocks each including a predetermined number of pre-pits, the blocks being disposed so as to be wobbled by a distance alternately toward an inner periphery or an outer periphery of the disk substrate along a radius direction of the disk substrate from a center line of each information track, the distance being substantially ½ of a track pitch of the information tracks, wherein the optical information recording/reproducing device comprises:

an optical system for radiating a light beam as a converged beam spot on one of the information tracks of the optical information recording medium;

an optical detector including two light receiving portions divided in parallel to the direction along which the one of the information tracks extends, the optical detector receiving the light beam reflected from the optical information recording medium;

a signal generator for generating a differential signal and an addition signal of two output signals respectively output from the two light receiving portions of the optical detector;

a header region detection circuit for determining whether the converged beam spot is tracing the header region or the data region based on the differential signal; and at least one reading circuit for reading the identification data from the differential signal and for reading information recorded in the data region from the addition signal;

wherein the header region detection circuit includes an envelope detection circuit for detecting an envelope of the differential signal and determines that the header region is being traced when the envelope exceeds a predetermined level.

2. An optical information recording/reproducing device for recording, reproducing, or erasing information on an optical information recording medium by radiating a light beam on the optical information recording medium, the optical information recording medium comprising information tracks formed in a spiral or concentric shape on a disk substrate, the information tracks including groove tracks and land tracks alternating with each other, each information track including:

a header region for recording identification data in the form of pre-pits, the identification data representing location information on the disk substrate, and a data region for recording user data, the pre-pits being grouped into blocks each including a predetermined number of pre-pits, the blocks being disposed so as to be wobbled by a distance alternately toward an inner periphery or an outer periphery of the disk substrate along a radius direction of the disk substrate from a center line of each information track, the distance being substantially ½ of a track pitch of the information tracks, wherein the optical information recording/reproducing device comprises:

an optical system for radiating a light beam as a converged beam spot on one of the information tracks of the optical information recording medium;

an optical detector including two light receiving portions divided in parallel to the direction along which the one of the information tracks extends, the optical detector receiving the light beam reflected from the optical information recording medium;

a signal generator for generating a differential signal and an addition signal of two output signals respectively output from the two light receiving portions of the optical detector;

a header region detection circuit for determining whether the converged beam spot is tracing the header region or the data region based on the differential signal;

at least one reading circuit for reading the identification data from the differential signal and for reading information recorded in the data region from the addition signal; and a selector for selectively coupling either the differential signal or the addition signal to the reading circuit in accordance with a result of determination by the header region detection circuit, wherein the selector couples the differential signal to the reading circuit when the header region detection circuit determines that the header region is being traced; and the selector couples the addition signal to the reading circuit when the header region detection circuit determines that the data region is being traced.

3. An optical information recording/reproducing device for recording, reproducing, or erasing information on an optical information recording medium by radiating a light beam on the optical information recording medium, the optical information recording medium comprising information tracks formed in a spiral or concentric shape on a disk substrate, the information tracks including groove tracks and land tracks alternating with each other, each information track including:

a header region for recording identification data in the form of pre-pits, the identification data representing location information on the disk substrate; and a data region for recording user data, the pre-pits being grouped into blocks each including a predetermined number of pre-pits, the blocks being disposed so as to be wobbled by a distance alternately toward an inner periphery or an outer periphery of the disk substrate along a radius direction of the disk substrate from a center line of each information track the distance being substantially ½ of a track pitch of the information tracks, wherein the optical information recording/reproducing device comprises:

an optical system for radiating a light beam as a converged beam spot on one of the information tracks of the optical information recording medium;

an optical detector including two light receiving portions divided in parallel to the direction along which the one of the information tracks extends, the optical detector receiving the light beam reflected from the optical information recording medium;

a signal generator for generating a differential signal and an addition signal of two output signals respectively output from the two light receiving portions of the optical detector;

a header region detection circuit for determining whether the converged beam spot is tracing the header region or the data region based on the differential signal; and at least one reading circuit for reading the identification data from the differential signal and for reading information recorded in the data region from the addition signal;

wherein the header region includes synchronization data for reproduction signal synchronization, and the header region detection circuit includes a synchronization signal detection circuit for detecting a synchronization signal from the differential signal, the synchronization signal corresponding to the synchronization data, and determines that the header region is being traced when the synchronization signal is detected.

4. An optical information recording/reproducing device for recording, reproducing, or erasing information on an optical information recording medium by radiating a light beam on the optical information recording medium, the optical information recording medium comprising information tracks formed in a spiral or concentric shape on a disk substrate, the information tracks including groove tracks and land tracks alternating with each other each information track including:

a header region for recording identification data in the form of pre-pits, the identification data representing location information on the disk substrate; and a data region for recording user data, the pre-pits being grouped into blocks each including a predetermined number of pre-pits, the blocks being disposed so as to be wobbled by a distance alternately toward an inner periphery or an outer periphery of the disk substrate along a radius direction of the disk substrate from a center line of each information track, the distance being substantially ½ of a track pitch of the information tracks, wherein the optical information recording/reproducing device comprises:

an optical system for radiating a light beam as a converged beam spot on one of the information tracks of the optical information recording medium;

an optical detector including two light receiving portions divided in parallel to the direction along which the one of the information tracks extends the optical detector receiving the light beam reflected from the optical information recording medium;

a signal generator for generating a differential signal and an addition signal of two output signals respectively output from the two light receiving portions of the optical detector;

a header region detection circuit for determining whether the converged beam spot is tracing the header region or the data region based on the differential signal; and at least one reading circuit for reading the identification data from the differential signal and for reading information recorded in the data region from the addition signal;

a waveform equalization circuit for converting frequency characteristics of an input signal; and a digitization circuit for digitizing a signal output from the waveform equalization circuit in accordance with a predetermined threshold value, wherein the waveform equalization circuit converts the frequency characteristics of the addition signal by using a first property and converts the frequency characteristics of the differential signal by using a second property.

5. An optical information recording/reproducing device according to claim 4, wherein the waveform equalization circuit includes means for selecting the first or second property in accordance with a result of determination by the header region detection circuit.

6. An optical information recording/reproducing device according to claim 5 further comprising:

a demodulation circuit for generating a demodulated signal by demodulating the digitized signal;

an output circuit for selectively outputting the demodulated signal from the demodulation circuit, either as a demodulated address when the header region is being traced or as demodulated data when the data region is being traced;

an error detection circuit for receiving the demodulated address and performing an error detection process for the demodulated address; and an error correction circuit for receiving the demodulated data and performing an error correction process for the demodulated data.

7. An optical information recording/reproducing device according to claim 4, wherein the waveform equalization circuit functions so that the differential signal whose frequency characteristics are converted by the second property is emphasized in its high frequency component relative to the addition signal whose frequency characteristics are converted by the first property.

8. An optical information recording/reproduction method for recording, reproducing, or erasing information on an optical information recording medium by radiating a light beam an the optical information recording medium, the optical information recording medium comprising information tracks formed in a spiral or concentric shape on a disk substrate, the information tracks including groove tracks and land tracks alternating with each other, each information track including:

a header region for recording identification data in the form of pre-pits, the identification data representing location information on the disk substrate; and a data region for recording user data, the pre-pits being grouped into blocks each including a predetermined number of pre-pits, the blocks being disposed so as to be wobbled by a distance alternately toward an inner periphery or an outer periphery of the disk substrate along a radius direction of the disk substrate from a center line of each information track, the distance being substantially ½ of a track pitch of the information tracks, wherein the method comprises the steps of:

radiating a light beam as a converged beam spot on one of the information tracks of the optical information recording medium;

detecting the light beam reflected from the optical information recording medium by using an optical detector including two light receiving portions divided in parallel to the direction along which the one of the information tracks extends;

generating a differential signal and an addition signal of two output signals respectively output from the two light receiving portions of the optical detector;

determining whether the converged beam spot is tracing the header region or the data region based on the differential signal;

reading the identification data from the differential signal when the differential signal is selected; and reading information in the data region from the addition signal when the addition signal is selected;

wherein the step of determination includes the steps of:

detecting an envelope of the differential signal; and determining that the header region is being traced when the envelope exceeds a predetermined level.

9. An optical information recording/reproducing method for recording, reproducing, or erasing information on an optical information recording medium by radiating a light beam on the optical information recording medium, the optical information recording medium comprising information tracks formed in a spiral or concentric shape on a disk substrate the information tracks including groove tracks and land tracks alternating with each other, each information track including:

a header region for recording identification data in the form of pre-pits, the identification data representing location information on the disk substrate; and a data region for recording user data, the pre-pits being grouped into blocks each including a predetermined number of pre-pits, the blocks being disposed so as to be wobbled by a distance alternately toward an inner periphery or an outer periphery of the disk substrate along a radius direction of the disk substrate from a center line of each information track, the distance being substantially ½ of a track pitch of the information tracks, wherein the method comprises the steps of:

radiating a light beam as a converged beam spot on one of the information tracks of the optical information recording medium;

detecting the light beam reflected from the optical information recording medium by using an optical detector including two light receiving portions divided in parallel to the direction along which the one of the information tracks extends;

generating a differential signal and an addition signal of two output signals respectively output from the two light receiving portions of the optical detector;

determining whether the converged beam spot is tracing the header region or the data region based on the differential signal;

reading the identification data from the differential signal when the differential signal is selected;

reading information in the data region from the addition signal when the addition signal is selected; and selecting either the differential signal or the addition signal in accordance with a result of the determination, wherein the differential signal is selected when it is determined in the step of determination that the header region is being traced; and the addition signal is selected when it is determined in the step of determination that the data region is being traced.

10. An optical information recording/reproducing method for recording, reproducing, or erasing information on an optical information recording medium by radiating a light beam on the optical information recording medium, the optical information recording medium comprising information tracks formed in a spiral or concentric shape on a disk substrate, the information tracks including groove tracks and land tracks alternating with each other, each information track including:

a header region for recording identification data in the form of pre-pits, the identification data representing location information on the disk substrate; and a data region for recording user data, the pre-pits being grouped into blocks each including a pre-determined number of pre-pits, the blocks being disposed so as to be wobbled by a distance alternately toward an inner periphery or an outer periphery of the disk substrate along a radius direction of the disk substrate from a center line of each information track, the distance being substantially ½ of a track pitch of the information tracks, wherein the method comprises the steps of:

radiating a light beam as a converged beam spot on one of the information tracks of the optical information recording medium;

detecting the light beam reflected from the optical information recording medium by using an optical detector including two light receiving portions divided in parallel to the direction along which the one of the information tracks extends;

generating a differential signal and an addition signal of two output signals respectively output from the two light receiving portions of the optical detector;

determining whether the converged beam spot is tracing the header region or the data region based on the differential signal;

reading the identification data from the differential signal when the differential signal is selected; and;

reading information in the data region from the addition signal when the addition signal is selected;

wherein the header region includes synchronization data for reproduction signal synchronization, and the step of determination includes the steps of:

detecting a synchronization signal from the differential signal, the synchronization signal corresponding to the synchronization data; and determining that the header region is being traced when the synchronization signal is detected.

11. An optical information recording/reproducing method for recording, reproducing, or erasing information on an optical information recording medium by radiating a light beam on the optical information recording medium, the optical information recording medium comprising information tracks formed in a spiral or concentric shape on a disk substrate, the information tracks including groove tracks and land tracks alternating with each other, each information track including:

a header region for recording identification data in the form of pre-pits, the identification data representing location information on the disk substrate; and a data region for recording user data, the pre-pits being grouped into blocks each including a predetermined number of pre-pits, the blocks being disposed so as to be wobbled by a distance alternately toward an inner periphery or an outer periphery of the disk substrate along a radius direction of the disk substrate from a center line of each information track, the distance being substantially ½ of a track pitch of the information tracks, wherein the method comprises the steps of:

radiating a light beam as a converged beam spot on one of the information tracks of the optical information recording medium;

detecting the light beam reflected from the optical information recording medium by using an optical detector including two light receiving portions divided in parallel to the direction along which the one of the information tracks extends;

generating a differential signal and an addition signal of two output signals respectively output from the two light receiving portions of the optical detector;

determining whether the converged beam spot is tracing the header region or the data region based on the differential signal;

reading the identification data from the differential signal when the differential signal is selected;

reading information in the data region from the addition signal when the addition signal is selected;

equalizing a waveform by converting the frequency characteristics of the addition signal using a first property when the addition signal is selected and by converting the frequency characteristics of the differential signal using a second property when the differential signal is selected; and digitizing a signal output in the waveform equalization step in accordance with a predetermined threshold value.

12. An optical information recording/reproducing method according to claim 8 further comprising the steps of:

generating a demodulated signal by demodulating the digitized signal;

performing an error detection process for the demodulated signal as a demodulated address when it is determined in the step of determination that the header region is being traced; and performing an error correction process for the demodulated signal as demodulated data when it is determined in the step of determination that the data region is being traced.

13. An optical information recording/reproducing method according to claim 11, wherein, in the waveform equalization step, the differential signal whose frequency characteristics are converted by the second property is emphasized in its high frequency component relative to the addition signal whose frequency characteristics are converted by the first property.

* * * * *